(12) United States Patent
Murata

(10) Patent No.: US 9,294,021 B2
(45) Date of Patent: Mar. 22, 2016

(54) CONTROL DEVICE, DRIVING DEVICE, AND IMAGE FORMING APPARATUS

(71) Applicant: Takuya Murata, Tokyo (JP)

(72) Inventor: Takuya Murata, Tokyo (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/290,087

(22) Filed: May 29, 2014

(65) Prior Publication Data

US 2014/0361715 A1    Dec. 11, 2014

(30) Foreign Application Priority Data

Jun. 10, 2013  (JP) ................. 2013-122258
May 21, 2014  (JP) ................. 2014-105112

(51) Int. Cl.
| | | |
|---|---|---|
| H02P 6/18 | (2006.01) | |
| H02P 6/16 | (2006.01) | |
| H02P 7/29 | (2006.01) | |
| H02P 21/14 | (2006.01) | |

(52) U.S. Cl.
CPC ....... *H02P 6/18* (2013.01); *H02P 6/165* (2013.01); *H02P 7/29* (2013.01); *H02P 21/146* (2013.01)

(58) Field of Classification Search
CPC ........................................... H02P 6/18
USPC ................ 318/400.02, 400.04, 400.05
See application file for complete search history.

(56) References Cited

U.S. PATENT DOCUMENTS

| | | | |
|---|---|---|---|
| 7,236,261 B2 * | 6/2007 | Motoi et al. | ............. 358/1.4 |
| 7,579,795 B2 * | 8/2009 | Komatsu et al. | ........ 318/254.1 |
| 8,432,123 B2 * | 4/2013 | Hofmann | ............ H02P 8/34 |
| | | | 318/254.1 |
| 2011/0266990 A1 | 11/2011 | Murata et al. | |
| 2013/0078021 A1 | 3/2013 | Sakamoto et al. | |
| 2013/0099708 A1 | 4/2013 | Shimizu et al. | |
| 2013/0106326 A1 | 5/2013 | Kamatani et al. | |
| 2013/0193894 A1 | 8/2013 | Kiguchi et al. | |
| 2013/0200836 A1 | 8/2013 | Ishizuka et al. | |
| 2013/0200838 A1 | 8/2013 | Seki et al. | |
| 2013/0257341 A1 | 10/2013 | Suzuki et al. | |
| 2013/0325187 A1 | 12/2013 | Shimizu et al. | |
| 2014/0044466 A1 | 2/2014 | Murata et al. | |
| 2014/0049199 A1 | 2/2014 | Ishizuka et al. | |

FOREIGN PATENT DOCUMENTS

| | | |
|---|---|---|
| JP | 09-047056 A | 2/1997 |
| JP | 10-052084 A | 2/1998 |
| JP | 2007-097365 A | 4/2007 |
| JP | 2012-213308 A | 11/2012 |
| JP | 2013-099023 A | 5/2013 |
| JP | 2013-108971 A | 6/2013 |

\* cited by examiner

*Primary Examiner* — David S Luo
(74) *Attorney, Agent, or Firm* — Oblon, McClelland, Maier & Neustadt, L.L.P.

(57) ABSTRACT

A control device includes a motor driving unit that supplies electric power to a motor according to a magnetic-pole-phase signal output from the motor; and a rotational-position detecting unit that converts the magnetic-pole-phase signal into a rotational-position detection signal and outputs the rotational-position detection signal. The rotational-position detection signal indicates a rotation amount and a rotation direction of an output shaft of the motor and has a higher resolution than the magnetic-pole-phase signal.

10 Claims, 17 Drawing Sheets

FIG.10

| PHASE INFORMATION SIGNAL | Hi | Low |
|---|---|---|
| U3 | U1 ≥ V1 | U1 < V1 |
| V3 | V1 ≥ W1 | V1 < W1 |
| W3 | W1 ≥ U1 | W1 < U1 |

FIG.11

| PERIOD | CONDITION OF INPUT SIGNALS | SELECTED SIGNAL | SIGNAL PHASE (°) |
|---|---|---|---|
| T1 | U3=V3=W3=Low, W2=Hi | W1 | 150 TO 180 |
| T2 | U3=V3=W3=Low, W2=Low | W1- | 0 TO 30 |
| T3 | U3=W3=Low, V3=Hi, V2=Low | V1 | 150 TO 180 |
| T4 | U3=W3=Low, W3=Hi, V2=Hi | V1- | 0 TO 30 |
| T5 | U3=V3=Hi, W3=Low, U2=Hi | U1 | 150 TO 180 |
| T6 | U3=V3=Hi, W3=Low, U2=Low | U1- | 0 TO 30 |
| T7 | U3=V3=W3=Hi, W2=Low | W1- | 150 TO 180 |
| T8 | U3=V3=W3=Hi, W2=Hi | W1 | 0 TO 30 |
| T9 | U3=W3=Hi, V3=Low, V2=Hi | V1- | 150 TO 180 |
| T10 | U3=V3=Hi, V3=Low, V2=Low | V1 | 0 TO 30 |
| T11 | U3=V3=Low, W3=Hi, U2=Low | U1- | 150 TO 180 |
| T12 | U3=V3=Low, W3=Hi, U2=Hi | U1 | 0 TO 30 |

Rotation angle: $\theta_1 = 180°$ $\theta_d[5:0]$ | bit5 ... bit0 | 1 0 0 0 0 0

Value of bit5 is set according to rotation result (Vy'(1)>0)

$\theta_d[5:0]$ | bit5 ... bit0 | 1 0 0 0 0 0

Rotation angle: $\theta_1 + \theta_2 = 180° + 90°$ $\theta_d[5:0]$ | bit5 ... bit0 | 1 1 0 0 0 0

Value of bit4 is set according to rotation result (Vy'(2)<0)

$\theta_d[5:0]$ | bit5 ... bit0 | 1 0 0 0 0 0

Rotation angle: $\theta_1 + \theta_2 - \theta_3 = 180° + 90° - 45°$

| | bit5 | | | ... | | bit0 |
|---|---|---|---|---|---|---|
| $\theta_d[5:0]$ | 1 | 0 | 1 | 0 | 0 | 0 |

Value of bit3 is set according to rotation result (Vy'(3)<0)

| | bit5 | | | ... | | bit0 |
|---|---|---|---|---|---|---|
| $\theta_d[5:0]$ | 1 | 0 | 0 | 0 | 0 | 0 |

Rotation angle: $\theta_1 + \theta_2 - \theta_3 - \theta_4 = 180° + 90° - 45° - 22.5°$ $\theta_d[5:0]$

| bit5 | ... | | | | bit0 |
|------|-----|---|---|---|------|
| 1 | 0 | 0 | 1 | 0 | 0 |

Value of bit2 is set according to rotation result (Vy'(4)>0)

$\theta_d[5:0]$

| bit5 | ... | | | | bit0 |
|------|-----|---|---|---|------|
| 1 | 0 | 0 | 1 | 0 | 0 |

FIG.19

| $\theta_d[1:0]$ | | ENC1 | ENC2 |
|---|---|---|---|
| bit1 | bit0 | | |
| 0 | 0 | H | L |
| 0 | 1 | H | H |
| 1 | 0 | L | H |
| 1 | 1 | L | L |

(H: High, L: Low)

CONTROL DEVICE, DRIVING DEVICE, AND IMAGE FORMING APPARATUS

CROSS-REFERENCE TO RELATED APPLICATIONS

The present application claims priority to and incorporates by reference the entire contents of Japanese Patent Application No. 2013-122258 filed in Japan on Jun. 10, 2013 and Japanese Patent Application No. 2014-105112 filed in Japan on May 21, 2014.

BACKGROUND OF THE INVENTION

1. Field of the Invention

The present invention relates generally to a control device, a driving device and image forming apparatuses.

2. Description of the Related Art

Stepping motors which allow position control, speed control, and position-hold (hereinafter, "hold") through pulse control have conventionally been used as driving sources in a large number of parts of image forming apparatuses such as copiers, facsimiles, and printers.

Stepping motors are advantageous in that position, speed, and hold are controllable through pulse control. However, to avoid loss of synchronism due to load fluctuation or change over time, a torque required of a stepping motor is larger than necessary, which disadvantageously makes stepping motors energy inefficient. Furthermore, a stepping motor capable of delivering a higher torque than required by an actual load is disadvantageously large and heavy.

In contrast, brushless direct current (DC) motors are advantageously highly efficient. This is because an electric current flowing through a brushless DC motor depends on a load. However, brushless DC motors are disadvantageous in that, unlike stepping motors, position/hold control cannot be performed.

A known example of a technique to solve these disadvantages by controlling rotational position of a brushless DC motor by adding a rotary encoder onto an output shaft of the brushless DC motor is disclosed in Japanese Laid-open Patent Publication No. 09-047056. For another example, a technique of controlling a rotational position of a brushless DC motor by adding a linear encoder onto an object to be driven by the brushless DC motor is disclosed in Japanese Laid-open Patent Publication No. 2007-097365.

However, providing a detecting device such as an encoder or a resolver on an output shaft of or an object to be driven by a brushless DC motor can cause a problem(s). Examples of the problem include occurrence of malfunction due to dust, dirt, or the like entrapped in a driving unit of the detecting device, heat-affected malfunction of the detecting device, and an increase in production cost resulting from an increase in the number of components.

Therefore, there is a need to provide a driving device and an image forming apparatus which allows position/hold control even if a detecting device is not provided on an output shaft of a brushless DC motor or an object to be driven by the brushless DC motor.

SUMMARY OF THE INVENTION

It is an object of the present invention to at least partially solve the problems in the conventional technology.

According to an embodiment, there is provided a control device that includes a motor driving unit that supplies electric power to a motor according to a magnetic-pole-phase signal output from the motor; and a rotational-position detecting unit that converts the magnetic-pole-phase signal into a rotational-position detection signal and outputs the rotational-position detection signal. The rotational-position detection signal indicates a rotation amount and a rotation direction of an output shaft of the motor and has a higher resolution than the magnetic-pole-phase signal.

According to another embodiment, there is provided a driving device that includes the control device according to the above embodiment; and the motor.

According to still another embodiment, there is provided an image forming apparatus that includes the driving device according to the above embodiment.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a diagram of determination logic used by a second phase-detector circuit;

FIG. 11 is a diagram illustrating selection conditions used by a signal selector circuit;

FIG. 19 is a diagram illustrating logic for generating a two-channel encoder-equivalent signal.

DETAILED DESCRIPTION OF THE PREFERRED EMBODIMENTS

Exemplary embodiments of the present invention are described below with reference to the accompanying drawings. While specific exemplary embodiments may provide an image forming apparatus which is a copier, a printer, a scanner, a facsimile, or the like, the embodiments are not limiting but only illustrative, and applicable to, for example, a multi-function peripheral (MFP) having at least two functions of a copier function, a printer function, a scanner function, and a facsimile function.

Image Forming Apparatus

Figure 1:
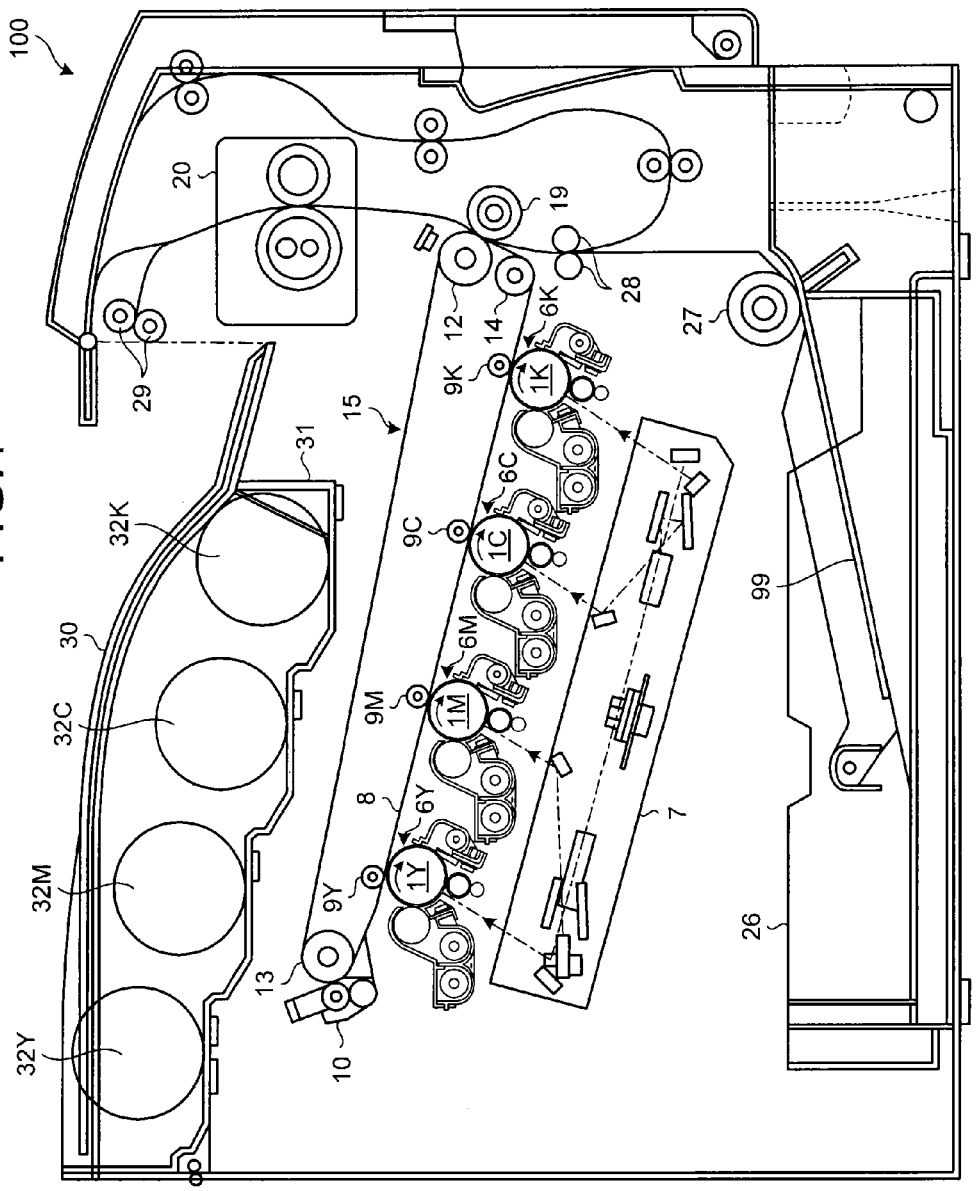
FIG. 1 is a diagram of a schematic configuration of an image forming apparatus according to an embodiment.

FIG. 1 is a diagram of a schematic configuration of an image forming apparatus 100 according to an embodiment of the present invention. As illustrated in FIG. 1, the image forming apparatus 100 includes four process cartridges, which are process cartridges 6Y, 6M, 6C, and 6K, for forming a yellow (Y) toner image, a magenta (M) toner image, a cyan (C) toner image, and a black (K) toner image, respectively.

The process cartridges 6Y, 6M, 6C, and 6K are identical in configuration except in color of developers, which are Y toner, M toner, C toner, and K toner, for use in image formation. Each of the process cartridges 6Y, 6M, 6C, and 6K is detachably attached to a body of the image forming apparatus 100 so that consumables can be replaced in one piece when the process cartridge has reached end of its usable life.

Figure 2:
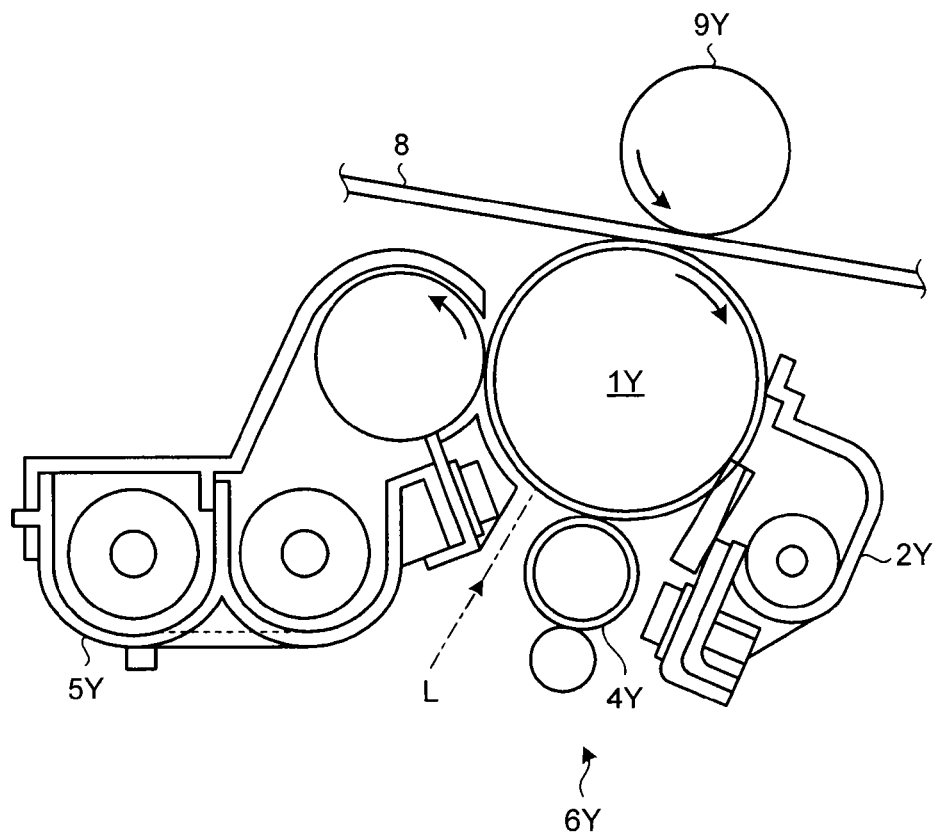
FIG. 2 is an enlarged view of a portion of and near a process cartridge.

Because the process cartridges 6Y, 6M, 6C, and 6K are similar in configuration, the schematic configuration of the image forming apparatus 100 is described taking the process cartridge 6Y for forming a Y-toner image as an example. FIG. 2 is an enlarged view of a portion of and near the process cartridge 6Y illustrated in FIG. 1. The configuration is described below with reference to FIGS. 1 and 2.

As illustrated in FIG. 2, the process cartridge 6Y includes a photosensitive drum 1Y serving as a latent image carrier, a drum cleaning device 2Y, a static neutralizer (not shown), an electrostatic charger 4Y, and a developing device 5Y.

The electrostatic charger 4Y is configured to uniformly electrostatically charge the surface of the photosensitive drum 1Y. More specifically, the photosensitive drum 1Y is rotated clockwise in FIG. 1 by a drum rotating mechanism. This rotation allows the electrostatic charger 4Y to uniformly electrostatically charge the surface of the photosensitive drum 1Y.

The uniformly-charged surface of the photosensitive drum 1Y is exposed to laser light L which scans the surface. As a result, the surface carries an electrostatic latent image for yellow (Y) thereon. The developing unit 5Y develops the electrostatic latent image on the surface of the photosensitive drum 1Y with Y toner into a Y-toner image. The Y-toner image on the surface of the photosensitive drum 1Y is transferred (as primary transfer) onto an intermediate transfer belt 8. This process is referred to as a primary transfer process.

The drum cleaning device 2Y is configured to remove residual toner remaining on the surface of the photosensitive drum 1Y after the primary transfer process. The static neutralizer is a device which neutralizes residual electric charge on the photosensitive drum 1Y after the cleaning. By this neutralization, the surface of the photosensitive drum 1Y is initialized to be ready for a next image forming job.

The other process cartridges 6M, 6C, and 6K form an M-toner image, a C-toner image, and a K-toner image on photosensitive drums 1M, 1C, and 1K, respectively, in a similar fashion. The toner images are transferred (as primary transfer) onto the intermediate transfer belt 8.

Referring to FIG. 1, an exposure device 7 is disposed below the process cartridges 6Y, 6M, 6C, and 6K in FIG. 1.

The exposure device 7 is configured to form electrostatic latent images on the surfaces of the photosensitive drums 1Y, 1M, 1C, and 1K described above. More specifically, the exposure device 7 illuminates the surfaces of the process cartridges 6Y, 6M, 6C, and 6K with the laser light L, which is emitted according to data representing an image to be formed, thereby performing exposure. By this exposure, a Y-electrostatic latent image, an M-electrostatic latent image, a C-electrostatic latent image, and a K-electrostatic latent image are formed on the surfaces of the photosensitive drums 1Y, 1M, 1C, and 1K, respectively.

The exposure device 7 forms the electrostatic latent images respectively on the surfaces of the photosensitive drums 1Y, 1M, 1C, and 1K by illuminating the photosensitive drums with the laser light L emitted from a light source via a plurality of optical lenses and mirrors while causing the laser light L to scan the surfaces using a polygon mirror rotated by a motor.

Referring to FIG. 1, a sheet feeding unit is disposed below the exposure device 7 in FIG. 1. The sheet feeding unit includes a paper cassette 26, a sheet feeding roller 27 assembled onto the paper cassette 26, and a pair of registration rollers 28.

The paper cassette 26 contains a plurality of sheets 99 of a recording medium. The sheet feeding roller 27 is in contact with an uppermost one of the sheets 99. When the sheet feeding roller 27 is rotated counterclockwise in FIG. 1 by a drive mechanism, the uppermost sheet 99 is fed toward between the pair of registration rollers 28.

The pair of registration rollers 28 is rotated to hold the sheet 99 therebetween, and temporarily stopped immediately after the pair of registration rollers 28 holds the sheet 99 therebetween. At an appropriate timing, the pair of registration rollers 28 delivers the sheet 99 toward a secondary transfer nip area, which will be described later.

Referring to FIG. 1, an intermediate transfer unit 15 is disposed above the process cartridges 6Y, 6M, 6C, and 6K in FIG. 1. The intermediate transfer unit 15 supports the intermediate transfer belt 8, which serves as an intermediate transfer member, in a looped and stretched manner and revolves the intermediate transfer belt 8.

The intermediate transfer unit 15 includes not only the intermediate transfer belt 8 but also a belt cleaning device 10. The intermediate transfer unit 15 further includes four primary-transfer bias rollers, which are primary-transfer bias rollers 9Y, 9M, 9C, and 9K, a secondary-transfer backup roller 12, a cleaning backup roller 13, and a tension roller 14.

The intermediate transfer belt 8 is looped and stretched over these seven rollers and revolved by at least one of the seven rollers counterclockwise in FIG. 1. The intermediate transfer belt 8 is interposed between the primary-transfer bias rollers 9Y, 9M, 9C, and 9K and the photosensitive drums 1Y, 1M, 1C, and 1K, respectively, to form primary nip areas. More specifically, the primary-transfer bias rollers 9Y, 9M, 9C, and 9K are arranged on the side opposite to the photoconductor drums 1Y, 1M, 1C, and 1K with respect to the intermediate transfer belt 8 and apply a transfer bias (of, e.g., positive polarity) which is opposite in polarity from the toner across the intermediate transfer belt 8.

The secondary-transfer backup roller 12, the cleaning backup roller 13, and the tension roller 14 are electrically grounded. The Y-toner image, the M-toner image, the C-toner image, and the K-toner image on the photosensitive drums 1Y, 1M, 1C, and 1K are transferred (as primary transfer) to be overlaid on one another onto the intermediate transfer belt 8 during a process in which the intermediate transfer belt 8 revolves passing through the primary transfer nip areas for Y, M, C, and K. Consequently, a four-color overlaid toner image (hereinafter, four-color toner image) is formed on the intermediate transfer belt 8.

The intermediate transfer belt 8 is interposed between the secondary-transfer backup roller 12 and a secondary transfer roller 19, forming a secondary nip area. The four-color toner image formed on the intermediate transfer belt 8 is transferred onto the sheet 99 at the secondary transfer nip area. The four-color toner image is combined with background white color of the sheet 99 to render a full-color image.

Residual toner which is not transferred onto the sheet 99 may remain on the intermediate transfer belt 8 exiting from the secondary transfer nip area. The residual toner is removed by the belt cleaning device 10. At the secondary transfer nip area, the sheet 99 is held between the intermediate transfer belt 8 and the secondary transfer roller 19, surfaces of which are moving in a forward direction, and conveyed in a direction away from the pair of registration rollers 28.

The sheet 99 exiting from the secondary transfer nip area is delivered to between rollers of a fixing unit 20, which is a unit detachably attached to the body of the image forming apparatus 100. While passing through between the rollers, the sheet 99 receives heat and pressure, whereby the full-color toner image on the surface of the sheet 99 is fixed. Thereafter, the sheet 99 is conveyed through a pair of sheet output rollers 29 to be discharged to the outside of the image forming apparatus 100.

The image forming apparatus 100 further includes a sheet stacking unit 30 on a top of a housing of the body of the image forming apparatus 100. The sheet 99 discharged to the outside of the image forming apparatus 100 by the pair of sheet output rollers 29 is stacked in the sheet stacking unit 30 one sheet by one sheet.

As illustrated in FIG. 1, a bottle support 31 is disposed between the intermediate transfer unit 15 and the sheet stacking unit 30 which is above the intermediate transfer unit 15. Toner bottles 32Y, 32M, 32C, and 32K serving as developer containers which respectively contain toner of corresponding colors therein are placed in the bottle support 31.

The color toner in each of the toner bottles 32Y, 32M, 32C, and 32K is supplied as appropriate by a corresponding toner supplying device to the developing device of a corresponding one the process cartridges 6Y, 6M, 6C, and 6K. The toner bottles 32Y, 32M, 32C, and 32K are attachable and detachable to and from the image forming apparatus 100 independently of the process cartridges 6Y, 6M, 6C, and 6K.

Figure 3:
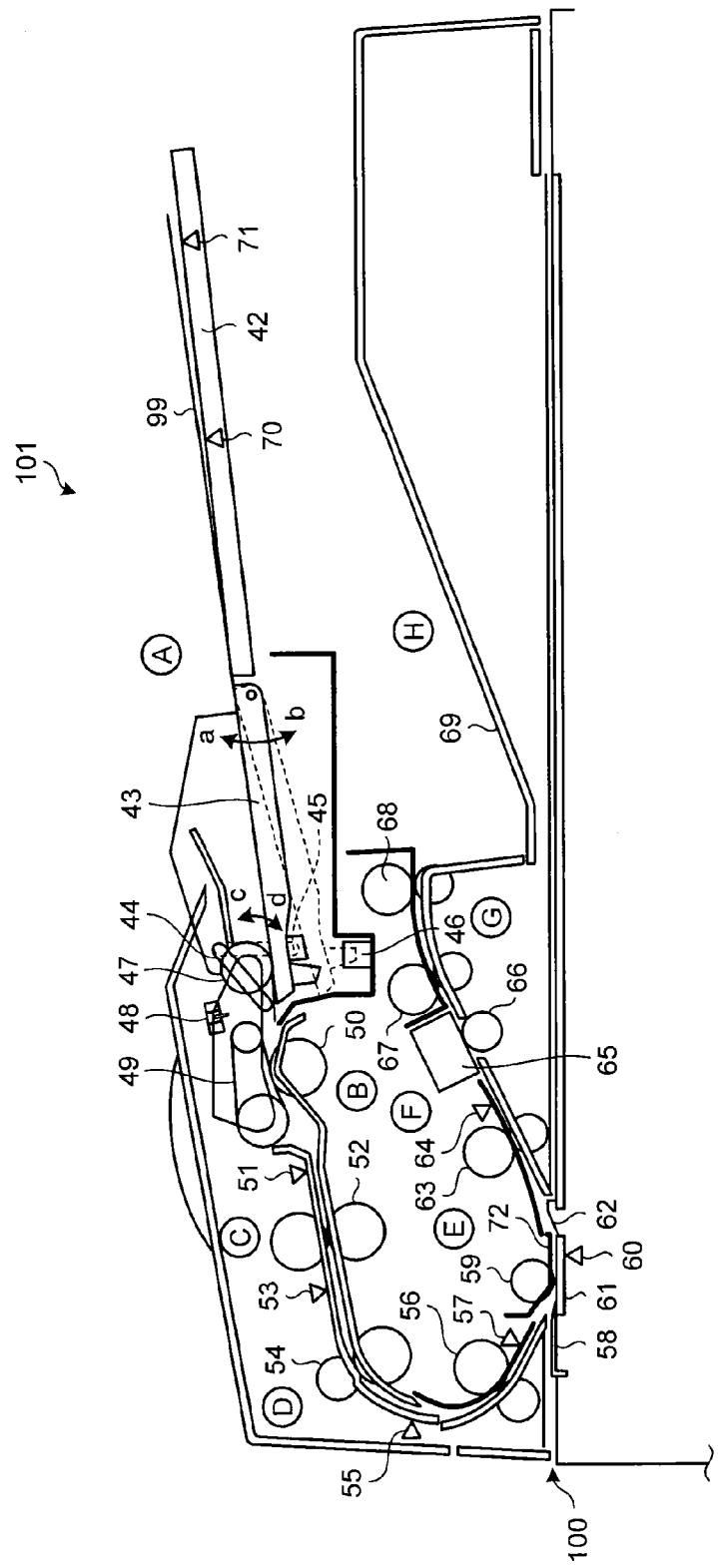
FIG. 3 is a diagram of a schematic configuration of a document conveying device utilized in the image forming apparatus.

FIG. 3 is a diagram of a schematic configuration of a document conveying device 101 for use with the image forming apparatus 100. The document conveying device 101 is disposed on a top portion of the image forming apparatus 100 illustrated in FIG. 1. The image forming apparatus 100 and the document conveying device 101 cooperate to function, as a whole, as a copier, an MFP, or the like. Accordingly, the image forming apparatus 100 to which the document conveying device 101 is added is also referred to as "the image forming apparatus 100" without distinguishing them from each other.

The document conveying device 101 illustrated in FIG. 3 is applicable to a document processing apparatus (automatic document feeder) which conveys a to-be-read original document (hereinafter, "document") to a stationary reading unit and reads an image while conveying the document at a preset velocity.

The document conveying device 101 includes a document receptacle unit A, a separating-and-feeding unit B, a registration unit C, a turning-over unit D, a first-read conveying unit E, a second-read conveying unit F, a sheet output unit G, and a stacker unit H. A sheaf of document sheets is to be placed in the document receptacle unit A. The separating-and-feeding unit B separates and feeds the document one sheet by one sheet from the sheaf placed in the document receptacle unit A. The registration unit C aligns the fed document by making contact with the document, then pulls out and conveys the aligned document. The turning-over unit D turns the conveyed document upside down and conveys the document with a first side (to-be-read face) of the document facing downward. The first-read conveying unit E causes an image on the first side of the document to be read from below an exposure glass. The second-read conveying unit F reads an image on a second side of the document from which the image on the first side has been read. The sheet output unit G discharges the document, from which the images on the first side and the second side have been read, to the outside of the device. The document from which the images having been read is stacked and held in the stacker unit H. The document conveying device 101 includes, as driving sources for driving the elements related to the conveyance described above, a pickup motor, a sheet feeding motor, a reading motor, a sheet output motor, and a bottom-plate elevating motor.

A document table 42, on which the sheet 99 to be read is to be placed, includes a movable document table 43. The sheet 99 is placed on the document table 42 with its first side (document face) facing up. The document table 42 further includes side guides which position the sheet 99 so as to orient the width direction of the sheet 99 perpendicular to a conveying direction. A feeler 44 and a placement sensor 45 detect the sheet 99 placed in the document table 42 and transmit a detection signal(s) to a control unit of the image forming apparatus 100 (hereinafter, "main control unit").

The document table 42 further includes document-length sensors 70 and 71 which are reflection-type sensors or actuator-type sensors capable of detecting the length of a document. The document-length sensors 70 and 71 determine the length of a document in the conveying direction. The document-length sensors 70 and 71 are arranged so as to be capable of determining at least in which one of a portrait orientation and a landscape orientation the document of a certain size is.

The movable document table 43 is movable in the directions indicated by arrows a and b in FIG. 3 by the bottom-plate elevating motor. When the feeler 44 and the placement sensor 45 detect that a document (sheaf) is placed on the movable document table 43, the bottom-plate elevating motor rotates forward to elevate the movable document table 43 so as to bring a top surface of the document (sheaf) into contact with a pickup roller 47. FIG. 3 illustrates an elevated state by solid lines.

The pickup roller 47 is configured to be moved in the directions indicated by arrows c and d in FIG. 3 by the pickup motor via a cam mechanism. Furthermore, the pickup roller 47 is configured to ascend in the direction indicated by the arrow c by being pushed up by the top surface of the document (sheaf) on the movable document table 43 when the movable document table 43 is elevated, so that an elevated-table detecting sensor 48 can detect an upper limit.

Forward rotation of the sheet feeding motor revolves a sheet feeding belt 49 in a sheet feeding direction. In contrast, forward rotation of the sheet feeding motor rotates a reverse roller 50 in the direction opposite to the sheet feeding direction. This configuration allows feeding only an uppermost document sheet by separating the uppermost document sheet from the other document sheets.

The reverse roller 50 is pressed against the sheet feeding belt 49 with a predetermined pressure. The reverse roller 50 prevents document multifeed by, in a case where two or more document sheets should enter a nip area between the sheet feeding belt 49 and the reverse roller 50, rotating clockwise in FIG. 3, which is forward direction of the reverse roller 50, thereby pushing back the other document sheets than the uppermost document sheet.

The single document sheet separated by the sheet feeding belt 49 and the reverse roller 50 is further conveyed by the sheet feeding belt 49. The document is conveyed a predetermined distance from a detection position where a leading end of the document is detected by a skew correction sensor 51. Conveying the document from the detection position the predetermined distance brings the document into contact with pull-out rollers 52. The sheet feeding motor is stopped to stop revolving of the sheet feeding belt 49 in a state where the document is pressed against the pull-out rollers 52 with the document being deflected a predetermined amount.

At this time, the pickup motor is rotated to cause the pickup roller 47 to retreat from the upper surface of the document so that the document is conveyed only by a conveyance force of the sheet feeding belt 49. As a result, the leading end of the document enters a nip area between upper and lower rollers of the pull-out rollers 52 where the leading end is aligned (i.e., skew correction is performed).

The pull-out rollers 52 have the skew correction function described above and, furthermore, convey the separated and skew-corrected document to intermediate rollers 54. The pull-out rollers 52 are driven by backward rotation of the sheet feeding motor. Note that backward rotation of the sheet feeding motor drives the pull-out rollers 52 and the intermediate rollers 54, but does not drive the pickup roller 47 and the sheet feeding belt 49.

A plurality of document width sensors 53 is arranged along a depth direction of the document. The document width sensors detect a width size of the document conveyed by the pull-out rollers 52. The length of the document in the conveying direction is determined based on motor's pulse count derived from detection of the leading end and the trailing end of the document by the skew correction sensor 51.

For conveyance of the document from the registration unit C to the turning-over unit D by the pull-out rollers 52 and the intermediate rollers 54, a conveyance speed in the registration unit C is set faster than a conveyance speed in the first-read conveying unit E to reduce time necessary for delivery of the document to a reading unit.

When the leading end of the document is detected by a reading entry sensor 55, the reading motor is rotated forward to drive a reading entry roller 56, a reading exit roller 63, and a contact image sensor (CIS) exit roller 67.

When the leading end of the document is detected by a registration sensor 57, the conveyance speed is gradually reduced over a predetermined conveyance distance. The document is then temporarily stopped at a position immediately upstream of a reading position 60 where a first reading unit (not illustrated) is disposed. Simultaneously, a stop signal is transmitted to the main control unit via an interface.

Subsequently, upon receiving a read start signal from the main control unit, the temporarily-stopped document is conveyed with a speed which gradually increases to a predetermined conveyance speed until the leading end of the document reaches the reading position.

From an instant when the leading end of the document reaches the reading unit, timing for which is determined based on a pulse count of the reading motor, a gate signal indicating an effective image region in the sub-scanning direction on the first side of the document is repeatedly transmitted to the main control unit until the trailing end of the document exits the first reading unit.

For simplex (one-sided) reading, the document passed through the first-read conveying unit E is conveyed via a second reading unit 65 to the sheet output unit G. During this conveyance, when the leading end of the document is detected by a sheet output sensor 64, the sheet output motor is rotated forward to rotate a sheet output roller 68 counterclockwise in FIG. 3.

Furthermore, a control operation of preventing the document discharged onto a sheet output tray 69 from falling out of the sheet output tray 69 is performed as follows. The sheet output motor is decelerated immediately before the trailing end of the document exits the nip area between upper and lower rollers of the sheet output roller 68, timing for which is determined based on a pulse count derived from detection of the leading end of the document by the sheet output sensor 64.

A coated member, to which surface coating is applied, is disposed on the surface of the second reading unit 65 to prevent vertical streaks which can appear when a sticky substance sticking to the document is transferred onto read lines.

The coated member is formed by applying a known coating material capable of decomposing dirt or a known hydrophilic coating material to the reading surface of the second reading unit 65. A known coating material can be used as the coating material.

Driving Device of First Embodiment

Figure 4:
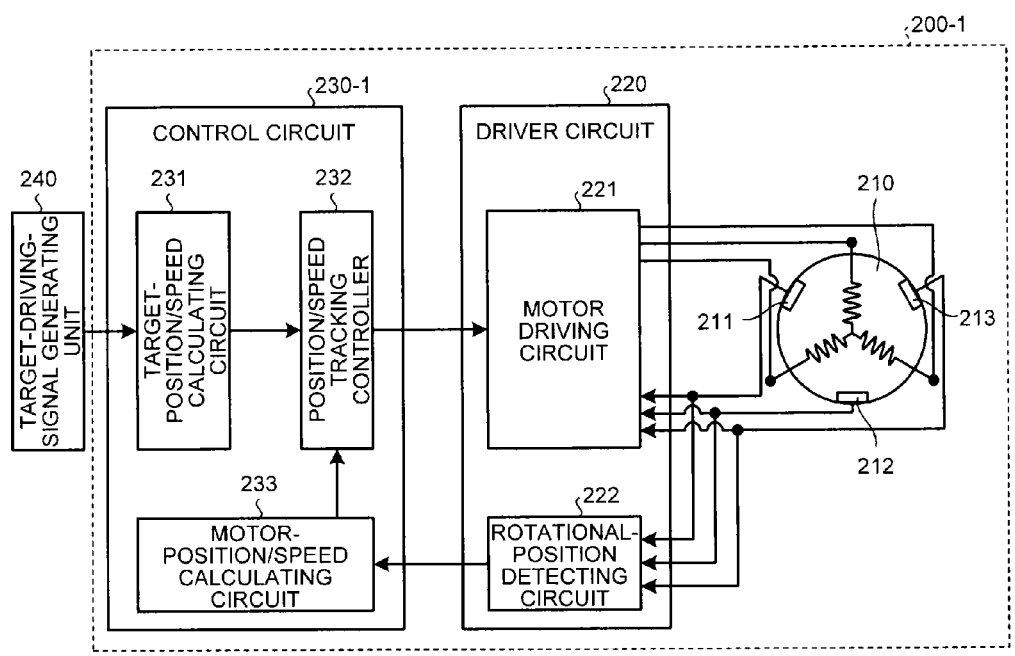
FIG. 4 is a block diagram illustrating a schematic configuration of a driving device according to a first embodiment.

FIG. 4 is a block diagram illustrating a schematic configuration of a driving device 200-1 according to a first embodiment. The driving device 200-1 illustrated in FIG. 4 can be utilized in a driving mechanism which drives the sheet feeding roller 27 or the like of the image forming apparatus 100 illustrated in FIG. 1, for example. For another example, the driving device 200-1 can be utilized in a driving mechanism which drives the reading entry roller 56, the reading exit roller 63, or the CIS exit roller 67 of the document conveying device 101 illustrated in FIG. 3.

Figure 5:
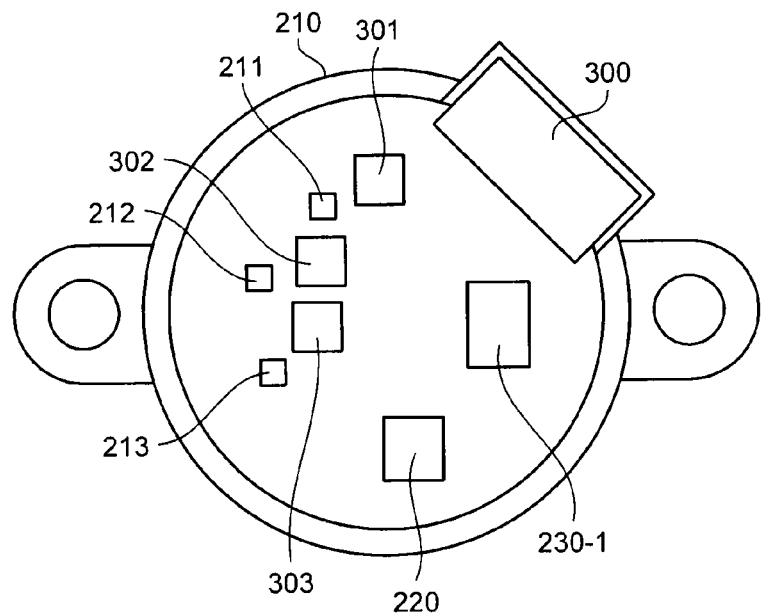
FIG. 5 is a plan view of a motor viewed from a side without a driving shaft.
Figure 6:
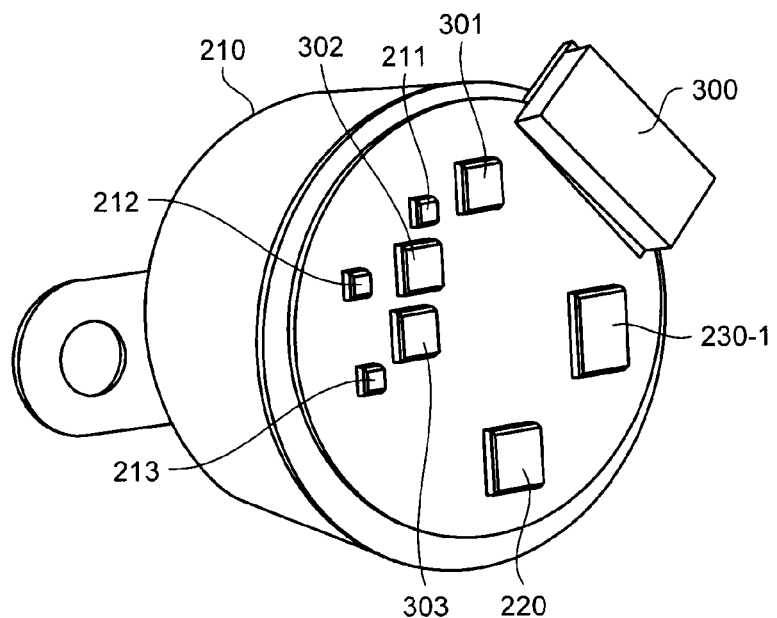
FIG. 6 is a perspective view of the motor viewed from a side without the driving shaft.

As illustrated in FIG. 4, the driving device 200-1 includes a motor 210 which is a drive source, a driver circuit 220 which supplies electric power to the motor 210, and a control circuit 230-1 which controls the motor 210 via the driver circuit 220. Although the driver circuit 220 and the control circuit 230-1 are depicted as being separate in FIG. 4, these two circuits are preferably arranged on a same circuit board as illustrated in FIGS. 5 and 6, for example, or on a same chip. FIG. 5 is a plan view of the motor 210 viewed from a side without a driving shaft (the opposite side of the driving shaft), and FIG. 6 is a perspective view of the motor 210 viewed from a side without the driving shaft. In FIGS. 5 and 6, a connector 300, Hall elements 211, 212, and 213, FETs 301, 302, and 303 which each function as a switch. Arranging the circuits 220 and 230-1, to which same signals are to be fed, on the same circuit board leads to effective use of the circuit board. Although the driver circuit 220 is depicted as not being mounted on the motor 210, it is preferable to mount the driver circuit 220 on a circuit board on the motor 210 so that the number of wire harnesses can be reduced for cost reduction. Although the control circuit 230-1 is depicted as driving the single motor 210 via the single driver circuit 220, alternatively, a configuration in which the control circuit 230-1 drives a plurality of the motors 210 via a plurality of the driver circuits 220 may be used. When the alternative configuration is used, the driver circuit 220 and the control circuit 230-1 may be arranged on a same circuit board; however, it is preferable to arrange the driver circuit 220 and the control circuit 230-1 on different, separate circuit boards. The reason therefor is as follows: because it is preferable to arrange the Hall elements 211, 212, and 213, which are placed near windings of the motor 210, and the driver circuit 220 on a same circuit board, arranging the plurality of driver circuits 220 and the control circuit 230-1 on the same circuit board is difficult or impracticable.

The motor 210 is a three-phase brushless DC motor. More specifically, the motor 210 does not include a commutator. Directions of magnetic poles of the motor 210 change each time the direction of direct current supplied from the driver circuit 220 is reversed by a semiconductor switch.

Because the motor 210 does not include a commutator, it is necessary to change the directions of the magnetic poles using a method other than using a commutator. For this reason, the motor 210 has a mechanism of feeding back magnetic-pole-phase signals indicating phases of the magnetic poles of the motor 210. The motor 210 illustrated in FIG. 4 is a three-phase motor. Accordingly, the motor 210 includes the three Hall elements 211, 212, and 213 to feed back the magnetic-pole-phase signals. Each of the Hall elements 211, 212, and 213 detects the magnetic field in the motor 210 by utilizing the Hall effect. The magnetic-pole-phase signals output from the Hall elements 211, 212, and 213 are sometimes referred to as "Hall signals".

The motor 210 illustrated in FIG. 4 includes the Hall elements 211, 212, and 213 to feed back the magnetic-pole-phase signals. Alternatively, the motor 210 may be what is referred to as a sensorless brushless DC motor which detects, for example, a back electromotive force. Although the driver circuit 220 and the Hall elements 211, 212, and 213 are depicted as being separate in FIG. 4, these elements are preferably arranged on the same circuit board, for example as illustrated in FIGS. 5 and 6. The reason therefor is as follows: if these elements are arranged on the same circuit board, signal disturbance due to external noise is less likely to occur as compared with a configuration in which these elements are connected via wire harnesses; furthermore, because the number of wire harnesses can be reduced, cost reduction can be achieved. More specifically, in the example illustrated in FIGS. 5 and 6, the connector 300 is connected to an external target-driving-signal generating unit 240 described later, so that provided is such a simple configuration that a target driving signal described later is received from the target-driving-signal generating unit 240. This configuration results in reduction of the number of wire harnesses. In addition, the output of the target-driving-signal generating unit 240 is signals indicating the rotation direction and the number of pulses, which are the same as signals to be output to conventional stepping motors, as described later. This allows replacement of the driving device 200-1 (parts illustrated in FIGS. 5 and 6) with respect to a conventional stepping motor.

The driver circuit 220 includes a motor driving circuit 221 and a rotational-position detecting circuit 222.

The motor driving circuit 221 in the driver circuit 220 supplies electric power to the motor 210 according to a magnetic-pole-phase signal output from the motor 210. Specifically, the motor driving circuit 221 is configured as a four-quadrant driver. The motor driving circuit 221 controls the electric current and the electric voltage to be applied to the motor 210 independently based on a control signal fed from the control circuit 230-1 and the Hall signals fed from the Hall elements 211, 212, and 213.

The rotational-position detecting circuit 222 in the driver circuit 220 converts the magnetic-pole-phase signal output from the motor 210 into a rotational-position signal indicating a rotation amount and a rotation direction of an output shaft of the motor and having a higher resolution than the magnetic-pole-phase signal, and outputs the rotational-position signal. Specifically, the rotational-position detecting circuit 222 generates a rotational-position signal indicating a rotational position of an output shaft of the motor 210 based on the Hall signals fed from the Hall elements 211, 212, and 213. The rotational-position signal is a signal (hereinafter, "two-channel encoder-equivalent signal") equivalent to a signal of two channels which could be output from a rotary encoder if the rotary encoder is arranged on the output shaft of the motor 210, and may be referred to as a "rotational-position detection signal". Examples of a method by which the rotational-position detecting circuit 222 generates the two-channel encoder-equivalent signal include a slicing method and a vector method. These methods will be described in detail later.

The control circuit 230-1 transmits a control signal to the motor driving circuit 221 based on the rotational-position detection signal output from the rotational-position detecting circuit 222 and the target driving signal received from a upper-level device. A combination of the driver circuit 220 and the control circuit 230-1 may be referred to as a control device. The driver circuit 220 alone may be referred to as a control device. Specifically, the control circuit 230-1 compares the rotational position signal output from the rotational-position detecting circuit 222 with the target driving signal fed from the target-driving-signal generating unit 240, and controls DC power to be supplied from the driver circuit 220 to the motor 210. In this embodiment, the target-driving-signal generating unit 240 corresponds to the upper-level device.

The control circuit 230-1 includes a target-position/speed calculating circuit 231, a position/speed tracking controller 232, and a motor-position/speed calculating circuit 233.

The target-position/speed calculating circuit 231 obtains, as the target driving signal, a rotation direction signal and a signal indicating the number of pulses given to drive the motor (hereinafter, "driving pulse count") from the external target-driving-signal generating unit 240. The target-position/speed calculating circuit 231 calculates a target position and a target speed of the motor 210 from the obtained target driving signal and a time signal output from an oscillator, which is included in the control circuit 230-1, and transmits the target position and the target speed to the position/speed tracking controller 232.

The motor-position/speed calculating circuit 233 receives the rotational-position signal from the rotational-position detecting circuit 222 in the driver circuit 220, and calculates a rotation direction and a driving pulse count of the output shaft of the motor 210. More specifically, as described above, the rotational-position signal is a signal equivalent to a signal of two channels which could be output from a rotary encoder if the rotary encoder is arranged on the output shaft of the motor 210. The rotational-position signal is a two-channel signal, with a fixed phase difference (in this embodiment, 90 degrees), the output of which varies depending on a rotation angle of the output shaft of the motor. Accordingly, the motor-position/speed calculating circuit 233 can calculate the rotation direction and the driving pulse count of the output shaft of the motor 210 by utilizing this phase difference.

The motor-position/speed calculating circuit 233 then calculates the rotational position and the rotation speed of the motor 210 based on the rotation direction and the driving pulse count of the output shaft of the motor 210, and the time signal output from the oscillator, and transmits the calculated rotational position and the rotation speed to the position/speed tracking controller 232.

The position/speed tracking controller 232 controls the motor driving circuit 221 so as to cause the rotational position and the rotation speed fed from the motor-position/speed calculating circuit 233 to attain the target position and the target speed fed from the target-position/speed calculating circuit 231 by feeding a signal, such as a pulse-width-modulation (PWM) output signal, a rotation direction signal, a start signal, a stop signal, or a brake signal, as appropriate.

As described above, the motor driving circuit 221 is configured as a four-quadrant driver. Accordingly, the control circuit 230-1 is configured to control rotation of the motor 210 in the following manner. The control circuit 230-1 calculates $\Delta Xt$, a target rotation amount per unit time, and Xt, a target total rotation amount, from the target driving signal. The control circuit 230-1 calculates $\Delta Xm$, a motor rotation amount per unit time, and Xm, a total motor rotation amount, from the rotational-position signal. Thereafter, the control circuit 230-1 changes the control signal to be fed to the motor driving circuit 221 so that the total motor rotation amount Xm attains the target total rotation amount Xt (=Xm) and the motor rotation amount per unit time $\Delta Xm$ attains the target rotation amount per unit time $\Delta Xt$ (=$\Delta Xm$).

As described above, the driving device 200-1 of the first embodiment detects the rotational position of the output shaft of the motor 210 by making use of the Hall signals which are generally used, by the motor driving circuit 221, in reversing the polarity of electric power supplied to the motor 210. For this purpose, the driving device 200-1 of the first embodiment includes, in the driver circuit 220, the rotational-position detecting circuit which outputs the rotational-position signal indicating the rotation amount and the rotation direction of the output shaft of the motor 210 by converting the Hall signals. The driving device 200-1 of the first embodiment configured as described above can perform position/hold control even if neither an encoder nor a resolver is provided on the output shaft of the motor 210 or an object to be driven by the motor 210.

Furthermore, the rotational-position detection signal utilized in the driving device 200-1 of the first embodiment is equivalent to a signal of two channels which could be output from a rotary encoder if the rotary encoder is arranged on the output shaft of the motor 210 and therefore highly compatible with a conventional driving device. It should be noted that the driving device 200-1 of the first embodiment is replaceable with a stepping motor which has conventionally been used in a driving mechanism of the image forming apparatus 100 without the necessity of changing other configuration. The two-channel encoder-equivalent signal is typically made up of two rectangular wave signals having a phase difference of 90 electrical degrees with respect to each other. Alternatively, the two-channel encoder-equivalent signal may be made up of waveform signals, e.g., sine wave signals or triangular wave signals, other than the rectangular wave signals.

Driving Device of Second Embodiment

Figure 7:
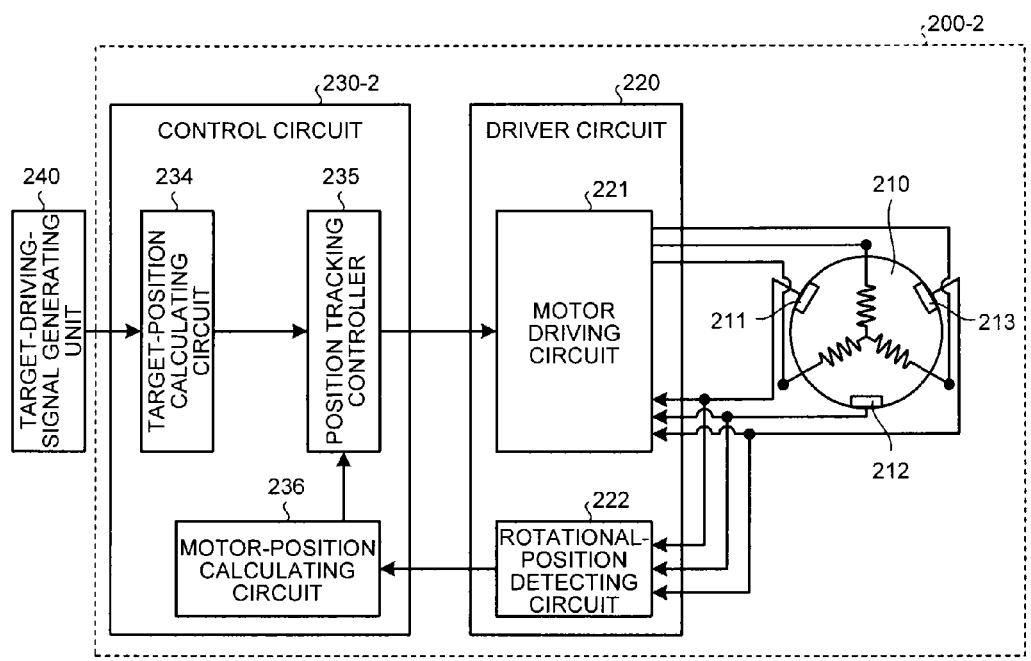
FIG. 7 is a block diagram illustrating a schematic configuration of a driving device according to a second embodiment.

FIG. 7 is a block diagram illustrating a schematic configuration of a driving device 200-2 according to a second embodiment of the embodiment. The driving device 200 illustrated in FIG. 7 can be used in a driving mechanism which drives the reading entry roller 56, the reading exit roller 63, or the CIS exit roller 67 of the document conveying device 101 illustrated in FIG. 3, for example. For another example, the driving device 200-2 can be utilized in a driving mechanism which drives the sheet feeding roller 27 or the like of the image forming apparatus 100 illustrated in FIG. 1. The driving device 200-2 of the second embodiment includes a number of elements identical to those of the driving device 200-1 of the first embodiment. Repeated description about the identical elements is appropriately omitted below.

The motor 210 is a brushless DC motor. More specifically, the motor 210 does not include a commutator. The directions of the magnetic poles change each time the direction of direct current supplied from the driver circuit 220 is reversed by a semiconductor switch.

The driver circuit 220 includes the motor driving circuit 221 and the rotational-position detecting circuit 222.

The motor driving circuit 221 in the driver circuit 220 is configured as a four-quadrant driver. The motor driving circuit 221 controls the electric current and the electric voltage to be applied to the motor 210 independently based on a control signal fed from a control circuit 230-2 and the Hall signals fed from the Hall elements 211, 212, and 213.

The rotational-position detecting circuit 222 in the driver circuit 220 generates a rotational-position signal indicating a rotational position of the output shaft of the motor 210 based on the Hall signals fed from the Hall elements 211, 212, and 213. The rotational-position signal is the two-channel encoder-equivalent signal that is equivalent to a signal of two channels which could be output from a rotary encoder if the rotary encoder is arranged on the output shaft of the motor 210. Examples of the method by which the rotational-position detecting circuit 222 generates the two-channel encoder-equivalent signal include the slicing method and the vector method. These methods will be described in detail later.

The control circuit 230-2 controls DC power to be supplied from the driver circuit 220 to the motor 210 based on a result of comparison between a target driving signal fed from the external target-driving-signal generating unit 240 and the rotational-position signal output from the rotational-position detecting circuit 222.

More specifically, the control circuit 230-2 includes a target-position calculating circuit 234, a position tracking controller 235, and a motor-position calculating circuit 236.

The target-position calculating circuit 234 in the control circuit 230-2 obtains, as a target driving signal, a rotation direction signal and a signal indicating a driving pulse count from the external target-driving-signal generating unit 240. The target-position calculating circuit 234 derives a target position of the motor 210 from the obtained target driving signal and a time signal output from an oscillator, and transmits the target position to the position tracking controller 235.

The motor-position calculating circuit 236 in the control circuit 230-2 receives the rotational-position signal from the rotational-position detecting circuit 222 in the driver circuit 220, thereby obtaining the rotation direction and the driving pulse count of the output shaft of the motor 210. Furthermore, the motor-position calculating circuit 236 derives the rotational position of the motor 210 based on the rotation direction and the driving pulse count of the output shaft of the motor 210, and the time signal output from the oscillator, and transmits the rotational position to the position tracking controller 235.

The position tracking controller 235 controls the motor driving circuit 221 so as to cause the rotational position fed from the motor-position calculating circuit 236 to attain the target position fed from the target-position calculating circuit 234 by feeding a signal, such as a PWM output signal, a rotation direction signal, a start signal, a stop signal, or a brake signal, as appropriate.

As described above, the motor driving circuit 221 is configured as a four-quadrant driver. Accordingly, the control circuit 230-2 is configured to control rotation of the motor 210 in the following manner. The control circuit 230-2 calculates the target total rotation amount Xt from the target driving signal. The control circuit 230-2 calculates the total motor rotation amount Xm from the rotational-position signal. Thereafter, the control circuit 230-2 changes the control signal to be fed to the motor driving circuit 221 so that the total motor rotation amount Xm attains the target total rotation amount Xt.

As described above, the driving device 200-2 of the second embodiment detects the rotational position of the output shaft of the motor 210 by making use of the Hall signals which are generally used, by the motor driving circuit 221, in reversing the polarity of electric power supplied to the motor 210. For this purpose, the driving device 200-2 of the second embodiment includes, in the driver circuit 220, the rotational-position detecting circuit that outputs the rotational-position signal indicating the rotation amount and the rotation direction of the output shaft of the motor 210 by converting the Hall signals. The driving device 200-2 of the second embodiment configured as described above can perform position/hold control even if neither an encoder nor a resolver is provided on the output shaft of the motor 210 or an object to be driven by the motor 210.

Furthermore, the rotational-position detection signal utilized in the driving device 200-2 of the second embodiment is equivalent to a signal of two channels which could be output from a rotary encoder if the rotary encoder is arranged on the output shaft of the motor 210 and therefore highly compatible with a conventional driving device. It should be noted that the driving device 200-2 of the second embodiment is replaceable with a stepping motor which has conventionally been used in a driving mechanism of the image forming apparatus 100 without the necessity of changing other configuration. The two-channel encoder-equivalent signal is typically made up of two rectangular wave signals having a phase difference of 90 electrical degrees with respect to each other. Alternatively, the two-channel encoder-equivalent signal may be made up of waveform signals, e.g., sine wave signals or triangular wave signals, other than the rectangular wave signals.

Exemplary configurations of the rotational-position detecting circuit 222, which is common to both the driving device 200-1 of the first embodiment and the driving device 200-2 of the second embodiment, are described below.

Slicing Method

Figure 8:
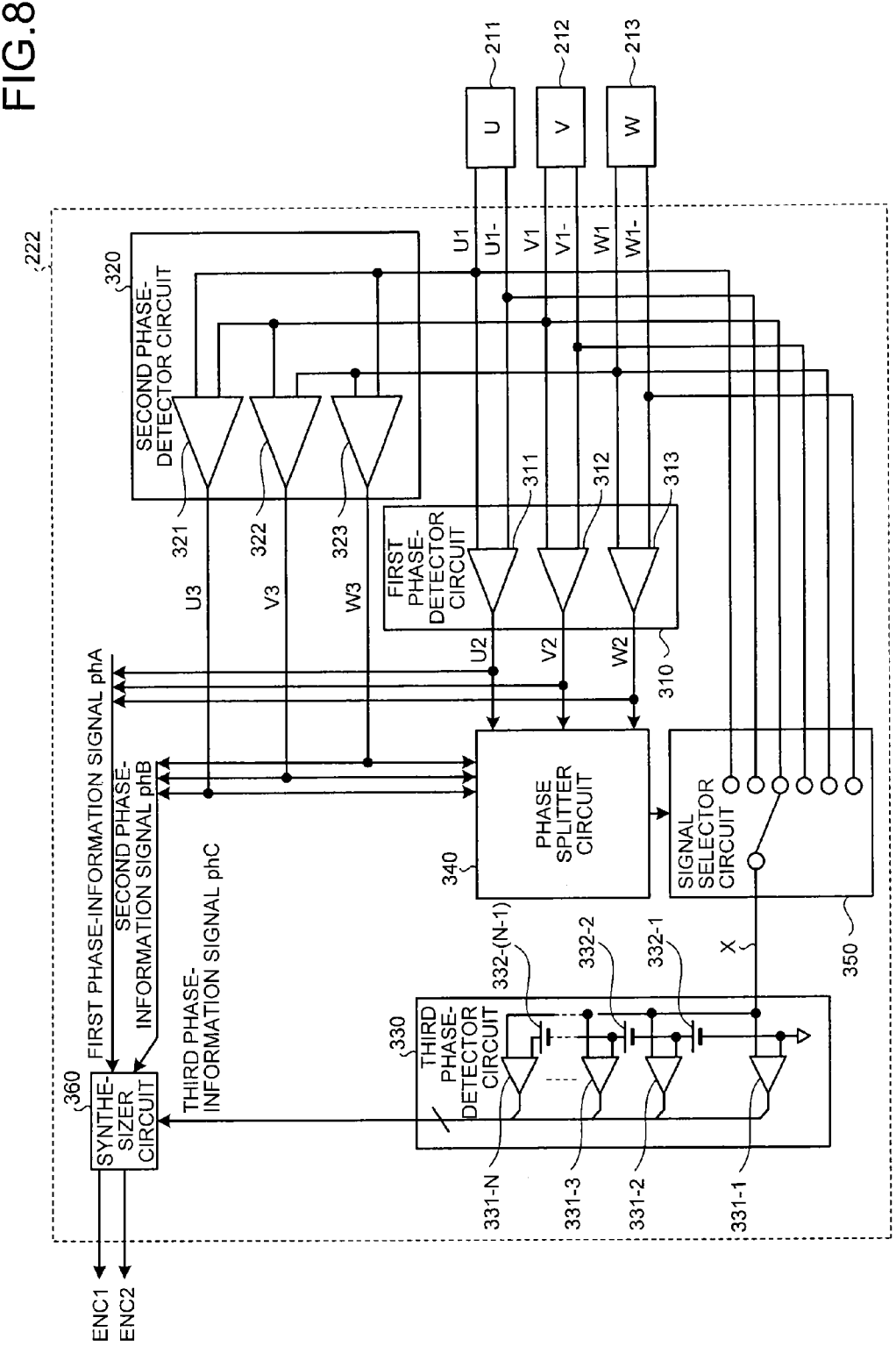
FIG. 8 is a circuit diagram illustrating a schematic configuration of a rotational-position detecting circuit which adopts a slicing method.

FIG. 8 is a circuit diagram illustrating a schematic configuration of the rotational-position detecting circuit 222 which adopts the slicing method. As illustrated in FIG. 8, the rotational-position detecting circuit 222 receives a Hall signal from the U-phase Hall element 211, a Hall signal from the V-phase Hall element 212, and a Hall signal from the W-phase Hall element 213, and outputs a two-channel encoder-equivalent signal.

Each of the Hall signals is a differential signal pair. The differential signal pair from the U-phase Hall element 211 is referred to as "U1, U1−". The differential signal pair from the V-phase Hall element 212 is referred to as "V1, V1−". The differential signal pair from the W-phase Hall element 213 is referred to as "W1, W1−". The two-channel encoder-equivalent signal output from the rotational-position detecting circuit 222 is referred to as "ENC1, ENC2".

As illustrated in FIG. 8, the rotational-position detecting circuit 222 includes a first phase-detector circuit 310, a second phase-detector circuit 320, a third phase-detector circuit 330, a phase splitter circuit 340, a signal selector circuit 350, and a synthesizer circuit 360.

The differential signal pairs (U1, U1−; V1, V1−; and W1, W1−) from the Hall elements 211, 212, and 213 are input to each of the first phase-detector circuit 310, the second phase-detector circuit 320, and the signal selector circuit 350.

The first phase-detector circuit 310 includes three comparators, which are comparators 311, 312, and 313. The comparators 311, 312, and 313 generate phase comparison signals U2, V2, and W2 each being of either a high (Hi) level or a low (Low) level, respectively, by comparing amplitude of the corresponding input differential signal pair with a predetermined reference level Ref, and output the phase comparison signals U2, V2, and W2 to the synthesizer circuit 360. The phase comparison signals U2, V2, and W2 from the first phase-detector circuit 310 make up a first phase-information signal phA. How the first phase-detector circuit 310 makes the above-described determination will be described later with reference to FIG. 9.

The second phase-detector circuit 320 includes three comparators, which are comparators 321, 322, and 323. The comparators 321, 322, and 323 generate binary phase comparison signals U3, V3, and W3, respectively, and output the phase comparison signals U3, V3, and W3 to each of the phase splitter circuit 340 and the synthesizer circuit 360. The phase comparison signals U3, V3, and W3 from the second phase-detector circuit 320 make up a second phase-information signal phB. How the second phase-detector circuit 320 makes the above-described determination will be described later with reference to FIG. 9.

The phase splitter circuit 340 generates a signal-select command based on the phase comparison signals U2, V2, W2, U3, V3, and W3, and outputs the signal-select command to the signal selector circuit 350. The signal selector circuit 350 selects a selection signal X from the differential signals U1, U1−, V1, V1−, W1, and W1−, which are fed to the signal selector circuit 350, in accordance with the signal-select command fed from the phase splitter circuit 340, and outputs the selection signal X to the third phase-detector circuit 330. How the signal selector circuit 350 makes the selection is described later with reference to FIG. 9.

Figure 9:
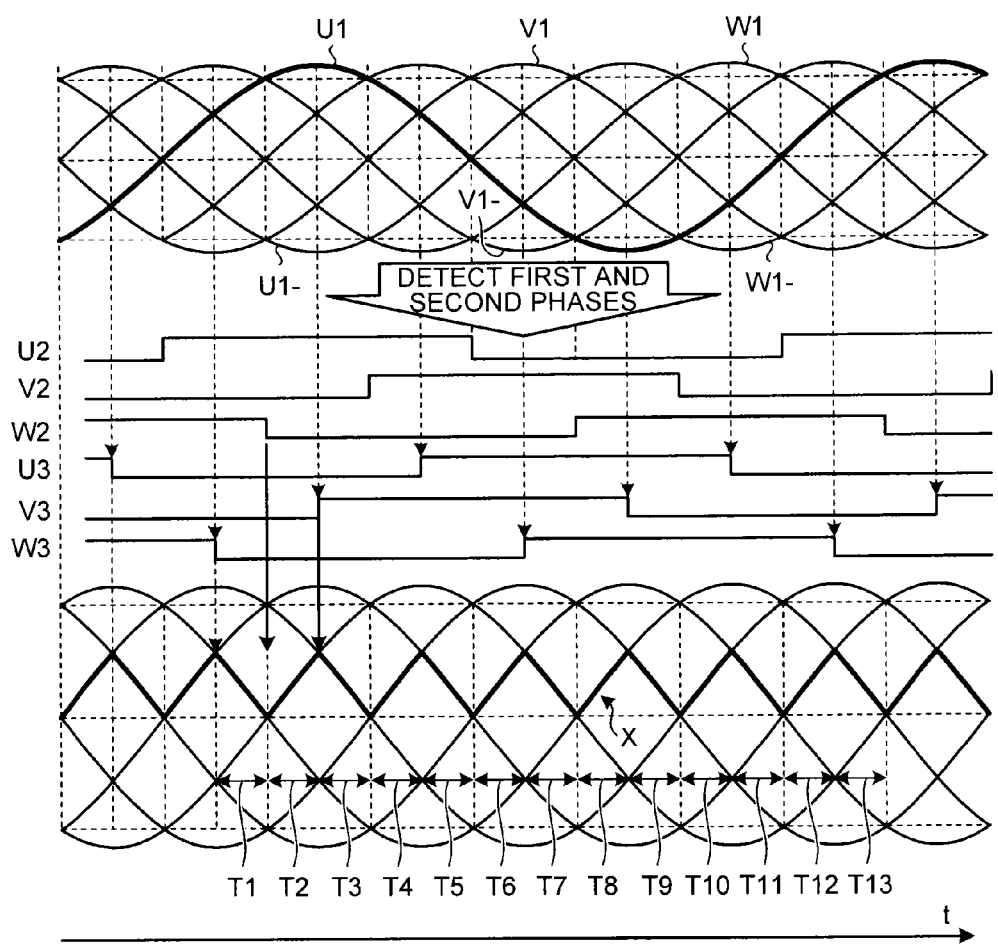
FIG. 9 is a timing chart of signals for describing how a selection signal is selected.

FIG. 9 is a timing chart of the signals for describing how the selection signal X is selected. Each of the differential signal pairs (U1, U1−; V1, V1−; W1, W1−) has a phase difference of 120 degrees because the differential signal pairs are derived from the Hall elements 211, 212, and 213.

As illustrated in FIG. 9, (1) the first phase-detector circuit 310 obtains the phase comparison signal U2 as a result of comparison for determining which one of the sensor signal U1 and the sensor signal U1− is lower. (2) The first phase-detector circuit 310 obtains the phase comparison signal V2 as a result of comparison for determining which one of the sensor signal V1 and the sensor signal V1− is lower. (3) The first phase-detector circuit 310 obtains the phase comparison signal W2 as a result of comparison for determining which one of the sensor signal W1 and the sensor signal W1− is lower.

By contrast, the second phase-detector circuit 320 obtains the phase comparison signals U3, V3, and W3 by making comparison of the differential signals U1, V1, and W1 according to determination logic illustrated in FIG. 10. The second phase-detector circuit 320 can obtain the phase comparison signals U3, V3, and W3 by making comparison of the differential signals U1−, V1 −, and W1− in a similar fashion.

The signal selector circuit 350 selects one of the differential signals (U1, U1−, V1, V1−, W1, and W1−) by applying a selection condition illustrated in FIG. 11 to the phase comparison signals U2, V2, W2, U3, V3, and W3, and outputs the selection signal as the selection signal X.

As described above, the selection signal X is selected by the signal selector circuit 350 every split-phase section of 30 degrees and is continuous across each boundary between split-phase sections. A sine wave is highly linear in a section where the phase is from 150 degrees to 180 degrees and in a section where the phase is from 0 degrees to 30 degrees. Accordingly, these sections are considerably advantageous in detection of a phase level by the downstream third phase-detector circuit 330.

The third phase-detector circuit 330 includes N−1 voltage sources 332-1 to 332-(N−1) and N phase detectors 331-1 to 331-N (N is an integer greater than one). The third phase-detector circuit 330 compares the selection signal X fed from the signal selector circuit 350 with each of a plurality of threshold levels generated by the N−1 voltage sources 332-1 to 332-(N−1), and outputs phase-information signals ph(1) to ph(4) to the synthesizer circuit 360. The phase-information signals ph(1) to ph(4) make up a third phase-information signal phC which allows detecting that the motor 210 has rotated through a predetermined angle by detecting that the selection signal X has reached a predetermined threshold level.

The synthesizer circuit 360 synthesizes the two-channel encoder-equivalent signal from the first phase-information signal phA, the second phase-information signal phB, and the third phase-information signal phC, and outputs the two-channel encoder-equivalent signal.

Figure 12:
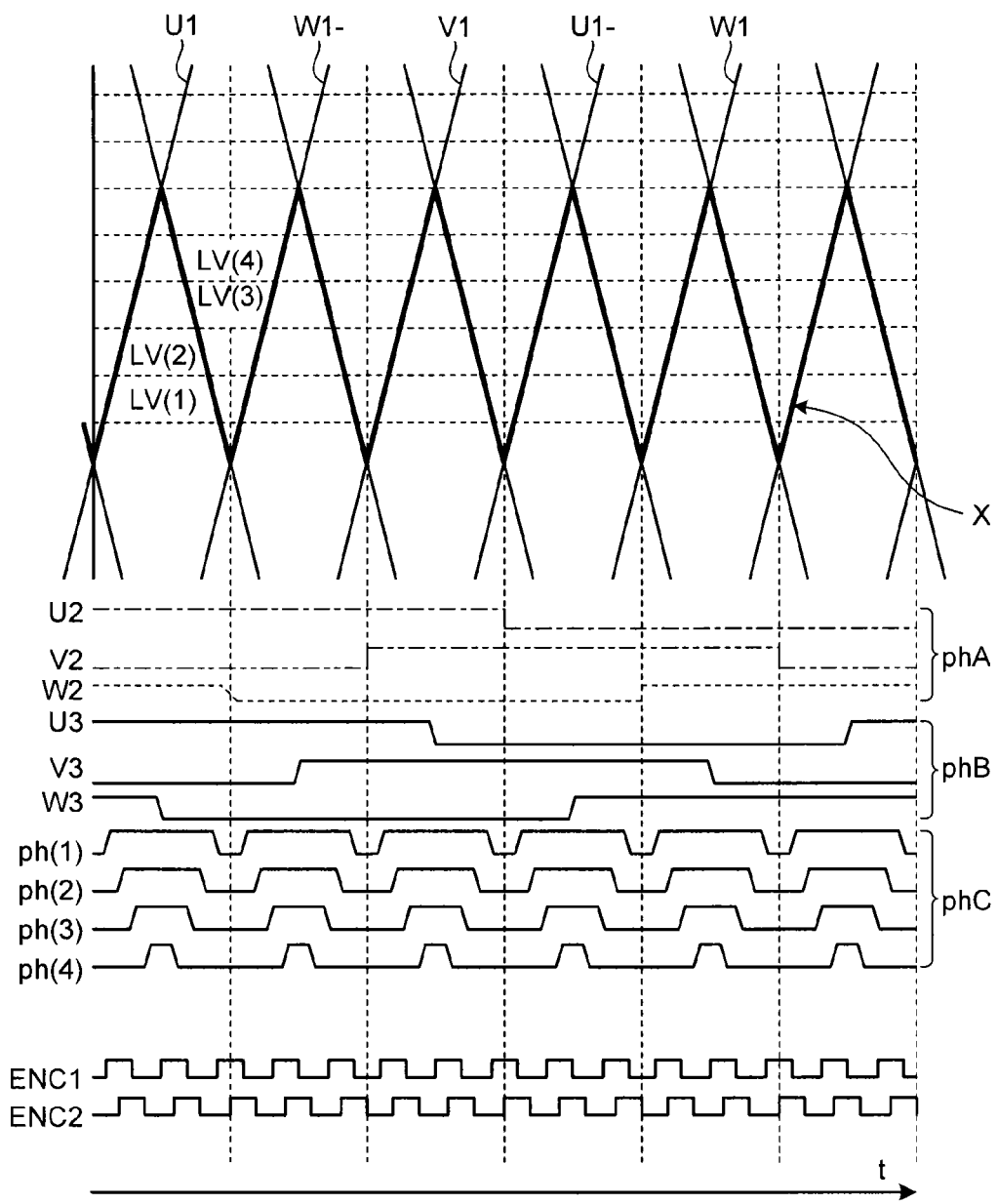
FIG. 12 is a timing chart of signals for describing operation of a third phase-detector circuit.

The signal and synthesis described above are described below in terms of the phases of the signals. FIG. 12 is a timing chart of the signals for describing operation of the third phase-detector circuit 330. More specifically, FIG. 12 is the timing chart in which the selection signal X output from the signal selector circuit 350, the phase comparison signals U2, V2, W2, U3, V3, and W3 output from the first phase-detector circuit 310 and the second phase-detector circuit 320, and the phase-information signals ph(1) to ph(4) output from the third phase-detector circuit 330 are arranged.

As described above, the phase comparison signals U2, V2, and W2 make up the first phase-information signal phA. The phase comparison signals U3, V3, and W3 make up the second phase-information signal phB. The phase-information signals ph(1) to ph(4) make up the third phase-information signal phC. Threshold levels LV(1) to LV(4) which divide each section of 30 electrical degrees into equal 5 parts are used in the example described above.

As is illustrated in FIG. 12, the synthesizer circuit 360 generates the two-channel encoder-equivalent signal made up of the synthesized signal ENC1 synthesized from the phase-information signals ph(1) and ph(3), and the phase comparison signals U3, V3, and W3, and the synthesized signal ENC1 synthesized from the phase-information signals ph(2) and ph(4), and the phase comparison signals U2, V2, and W2.

As described above, the rotational-position detecting circuit 222 which adopts the slicing method includes the rotational-position detecting circuit 222 in the driver circuit 220. Accordingly, the rotational-position detecting circuit 222 can obtain the two-channel encoder-equivalent signal even if a rotary encoder is not provided on the output shaft of the motor 210.

The rotational-position detecting circuit 222 which adopts the slicing method is an example of a rotational-position detecting circuit which adopts the slicing method. The rotational-position detecting circuit 222 may have any appropriate alternative configuration so long as including: the signal selector circuit 350 that outputs the selection signal X so that highly-linear phase sections selected from the Hall signals (U1, U1−; V1, V1−; W1, W1−) derived from the Hall elements 211, 212, and 213 are connected; a phase-detector circuit which detects phase information of the Hall signals by comparing the selection signal against a predetermined threshold value; and a synthesizer circuit which synthesizes the two-channel encoder-equivalent signal ENC1, ENC2 based on the phase information.

Vector Method

Figure 13:
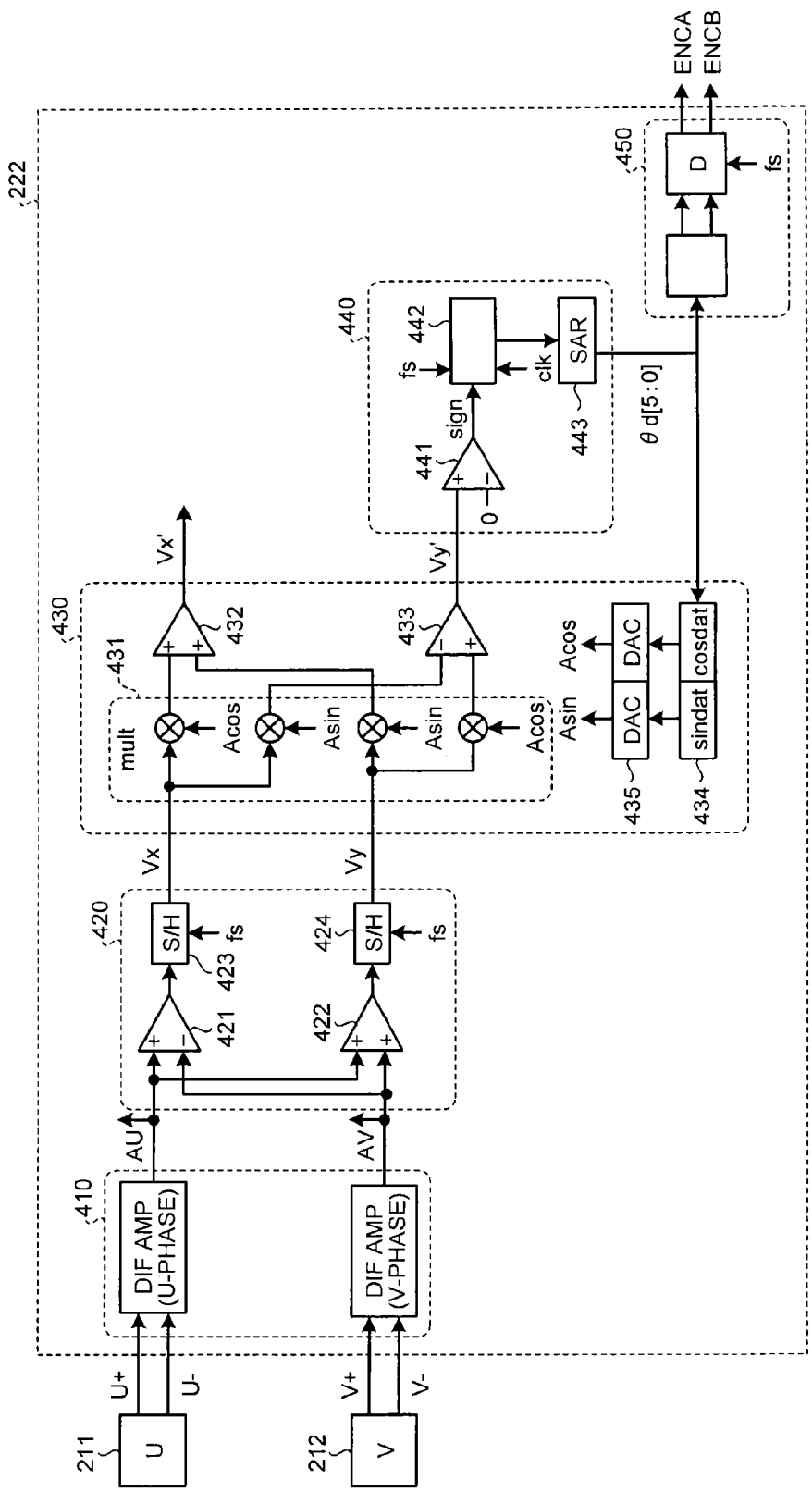
FIG. 13 is a circuit diagram illustrating a schematic configuration of a rotational-position detecting circuit which adopts a vector method.

FIG. 13 is a circuit diagram illustrating a schematic configuration of the rotational-position detecting circuit 222 which adopts the vector method. As illustrated in FIG. 13, the rotational-position detecting circuit 222 receives a Hall signal from the U-phase Hall element 211 and a Hall signal from the V-phase Hall element 212, and outputs a two-channel encoder-equivalent signal.

Each of the Hall signals is a differential signal pair. The differential signal pair from the U-phase Hall element 211 is referred to as "U+, U−". The differential signal pair from the V-phase Hall element 212 is referred to as "V+, V−". The two-channel encoder-equivalent signal output from the rotational-position detecting circuit 222 is referred to as "ENC1, ENC2".

The rotational-position detecting circuit 222 of this exemplary configuration uses the differential signal pair U+, U− output from the U-phase Hall element 211 and the differential signal pair V+, V− output from the V-phase Hall element 212. Alternatively, the rotational-position detecting circuit 222 may be configured to use the differential signal pair W+, W− output from the W-phase Hall element 213. Any two magnetic-pole phases of the U-phase, the V-phase, and the W-phase may be similarly selected and used by the rotational-position detecting circuit 222 of this exemplary configuration which adopts the vector method.

As illustrated in FIG. 13, the rotational-position detecting circuit 222 includes differential amplifiers 410, a vector generating circuit 420, a vector rotation circuit 430, an angle-search control circuit 440, and a two-phase-pulse generating circuit 450.

The differential amplifiers 410 obtain an analog Hall signal AU, which is one of the differential signal pair U+, U− or, put another way, a single-ended output from the U− phase Hall element 211, and an analog Hall signal AV, which is one of the differential signal pair V+, V− or, put another way, a single-ended output from the V-phase Hall element 212. Waveforms of the analog Hall signals AU and AV are expressed by two sinusoidal functions having different phases with respect to a rotation angle θ of the output shaft of the motor 210.

The vector generating circuit 420 includes a difference amplifier 421, a summing amplifier 422, and sample-and-hold (S/H) circuits 423 and 424. The vector generating circuit 420 generates a vector (Vx, Vy) of an X-component and a Y-component from the analog Hall signals AU and AV fed from the differential amplifiers 410.

The difference amplifier 421 multiplies a difference between the analog Hall signals AU and AV, which are fed from the differential amplifiers 410, by a gain ($1/\sqrt{3}$). In response to a trigger fs, the S/H circuit 423 samples and holds an output of the difference amplifier 421, and outputs the thus-held value as the X-component Vx. The summing amplifier 422 sums the analog Hall signals AU and AV fed from the differential amplifiers 410. In response to the trigger fs, the S/H circuit 424 samples and holds an output of the summing amplifier 422, and outputs the thus-held value as the Y-component Vy.

The trigger fs is obtained by dividing a clock signal clk, which is generated by an oscillator, by a frequency division ratio. The frequency division ratio for use in generating the trigger fs is to be set so as to make the trigger fs larger than a word length of detection angle data $\theta_d$ to avoid incompatibility with a sequence of the angle-search control circuit 440. The detection angle data $\theta_d$ and the sequence will be described later.

It will be known from a simple calculation that the components of the vector (Vx, Vy) generated by the vector generating circuit 420 are trigonometric functions of the angle θ, where the phase difference between the X-component Vx and the Y-component Vy is 90 degrees.

The vector rotation circuit 430 performs rotation conversion of the vector (Vx, Vy) by converting the trigonometric functions of the angle θ generated by the vector generating circuit 420 to values of a detection angle data $θ_d$, which will be described later. The thus-obtained values are output as a rotated X-component Vx' and a rotated Y-component Vy'.

The vector rotation circuit 430 includes multipliers 431, a summing amplifier 432, a difference amplifier 433, a memory 434, and a digital-analog converter (DAC) 435.

The memory 434 is a non-volatile memory. The memory 434 stores therein sine data sin dat and cosine data cos dat over one period divided into 64 divisions with amplitude expressed in 128 (least significant bit (LSB)), and outputs a value of the data sin dat and a value of the cosine data associated with the detection angle data $θ_d$ having the word length of 6 bits.

The DAC 435 converts the data values sin dat and cos dat output from the memory 434 into analog values proportional to the data values, and outputs the analog values as an analog sine value A sin and an analog cosine value A cos.

The multipliers 431 are analog multipliers. The multipliers 431 multiply every combination of the X-component Vx and the Y-component Vy, and the analog sine value A sin and the analog cosine value A cos, and output results of the four multiplications.

The summing amplifier 432 sums predetermined two of the four multiplication results output from the multipliers 431, and outputs the result of the sum as the rotated X-component Vx'. The rotated X-component Vx' may further be multiplied by a gain. The difference amplifier 433 subtracts a predetermined one of the remaining two of the multiplication results output from the multipliers 431 from the other one of the remaining two, and outputs the result of subtraction as the rotated Y-component Vy'. The rotated Y-component Vy' may further be multiplied by a gain.

The vector rotation circuit 430 thus performs calculation of rotating the vector represented by the X-component Vx and the Y-component Vy through the detection angle data $θ_d$ clockwise. The analog sine value A sin and the analog cosine value A cos of this exemplary configuration correspond to polyphase reference sine waves of the embodiment.

The rotated Y-component Vy' output from the vector rotation circuit 430 is fed to the angle-search control circuit 440.

The angle-search control circuit 440 includes a sign determining circuit 441, a sequencer 442, and a successive approximation register (SAR) 443. Each time receiving the trigger fs, the angle-search control circuit 440 searches for a detection angle at which the rotated Y-component Vy' is approximately zero by varying the detection angle data $θ_d$.

The sign determining circuit 441 outputs a sign-determination result "sign" based on a result of determination as to whether the value of the rotated Y-component Vy' is larger than zero. Although the determination is made with reference to zero, the sign may alternatively be determined with reference to a predetermined offset value.

The SAR 443 is loaded with a value which is to be overwritten by the sequencer 442 as appropriate. The value stored in the SAR 443 is output as the detection angle data $θ_d$. The word length of the detection angle data $θ_d$ is 6 bits in the embodiment.

The sequencer 442 performs an angle search sequence as follows. Each time receiving the trigger fs, the sequencer 442 overwrites the value in the SAR 443, in response to which the value of the sign-determination result "sign" is varied. The sequencer 442 sets the value in the SAR 443 according to the sign-determination result "sign".

How the sequencer 442 operates will be described in detail below with reference to FIGS. 12 to 16.

Figure 14:
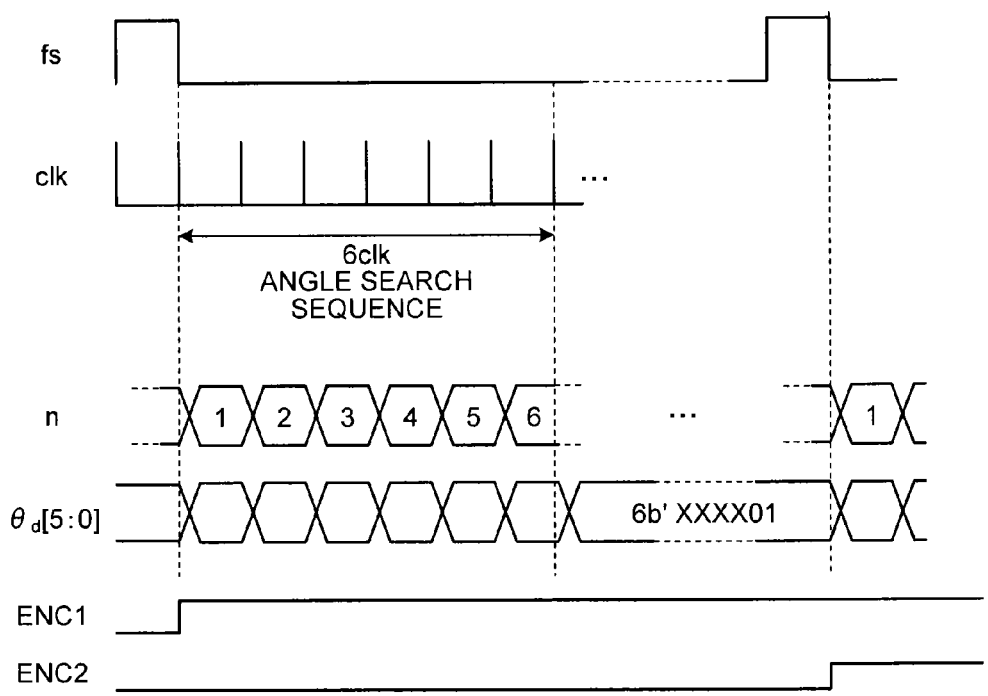
FIG. 14 is a timing chart of an angle search sequence.
Figure 15:
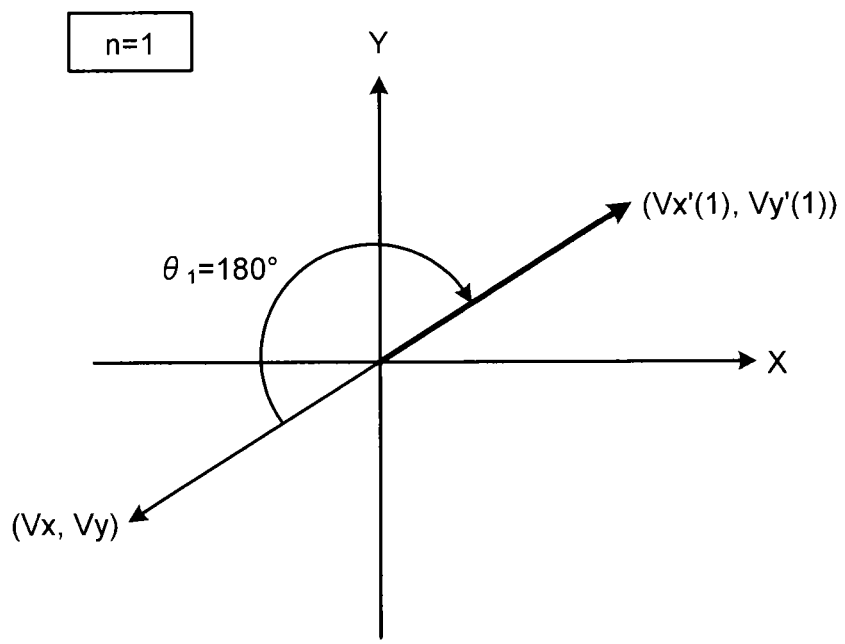
FIG. 15 is a diagram illustrating the angle search sequence at a step where count n=1.

First, upon receiving the trigger fs, the sequencer 442 sets the value of a count n to 1 as illustrated in FIG. 14, and sets only the value of bit5, the most significant bit, of the SAR 443 to 1 with the remaining bits set to 0 as illustrated in FIG. 15. Overwriting the value in the SAR 443 is equivalent to varying the value of the detection angle data $θ_d$.

The thus-changed detection angle data $θ_d$ is fed back to the vector rotation circuit 430. The vector rotation circuit 430 rotates the vector (Vx, Vy) clockwise through an angle $θ_1=180°$. The rotated X-component Vx' and the rotated Y-component Vy' obtained by this rotation are denoted as Vx'(1) and Vy'(1). The sequencer 442 detects the sign of Vy'(1) based on the sign determination result "sign". If the sign of Vy'(1) is positive, the sequencer 442 sets the most significant bit of the SAR 443 to 1.

Figure 16:
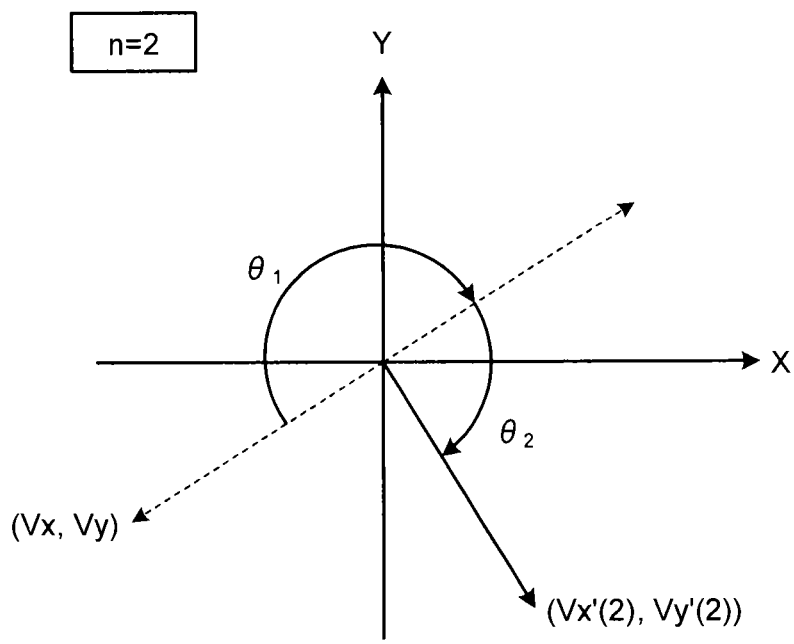
FIG. 16 is a diagram illustrating the angle search sequence at a step where count n=2.

Upon receiving a next clock clk, the sequencer 442 increments the count n to 2 as illustrated in FIG. 14, and overwrites the value of bit4, the second most significant bit, of the SAR 443 with 1 as illustrated in FIG. 16. Because it is unnecessary to change the value of bit5, the sequencer 442 overwrites neither bit5 nor the other bits.

The detection angle data $θ_d$ having been changed for second time is fed back to the vector rotation circuit 430. The vector rotation circuit 430 rotates the vector (Vx, Vy) clockwise through an angle $θ_1+θ_2=(180+90)°$. Components obtained as a result of this rotation are denoted by Vx'(2) and Vy'(2) as in the case described above. The sequencer 442 detects the sign of Vy'(2) based on the sign determination result "sign". If the sign of Vy'(2) is negative, the sequencer 442 sets bit4 of the SAR 443 to 0.

Figure 17:
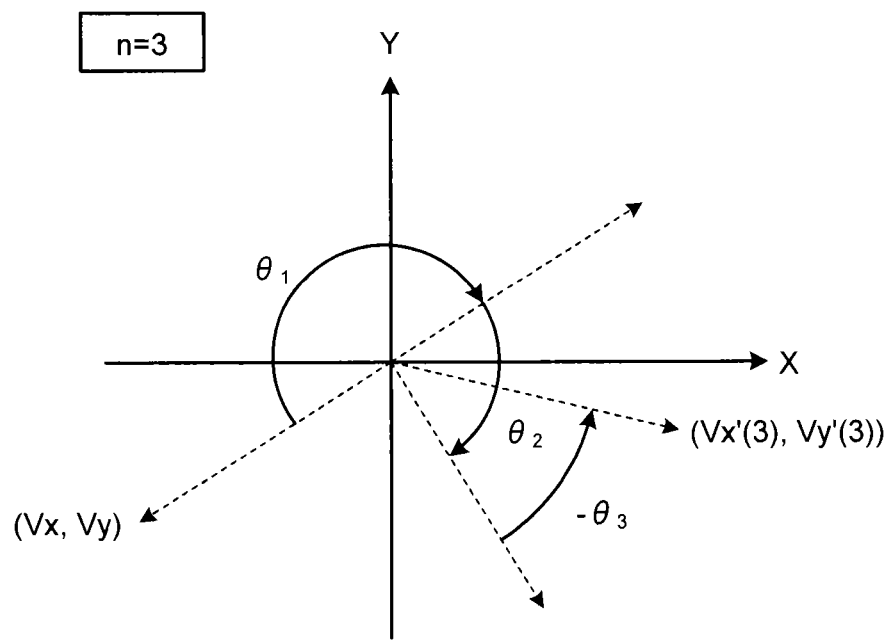
FIG. 17 is a diagram illustrating the angle search sequence at a step where count n=3.

Upon receiving a next clock clk, the sequencer 442 increments the count n to 3 as illustrated in FIG. 14, and overwrites the value of bit3, the third most significant bit, of the SAR 443 with 1 as illustrated in FIG. 17. Simultaneously, the sequencer 442 overwrites the value of bit4, which has been set at n=2, with 2, but does not overwrite the values of the other bits.

The detection angle data $θ_d$ having been changed for third time is fed back to the vector rotation circuit 430. The vector rotation circuit 430 rotates the vector (Vx, Vy) clockwise through an angle $θ_1+θ_2-θ_3=(180+90-45)°$. Components obtained as a result of this rotation are denoted by Vx'(3) and Vy'(3) as in the case described above. The sequencer 442 detects the sign of Vy'(3) based on the sign determination result "sign". If the sign of Vy'(3) is negative, the sequencer 442 sets bit3 of the SAR 443 to 0.

Figure 18:
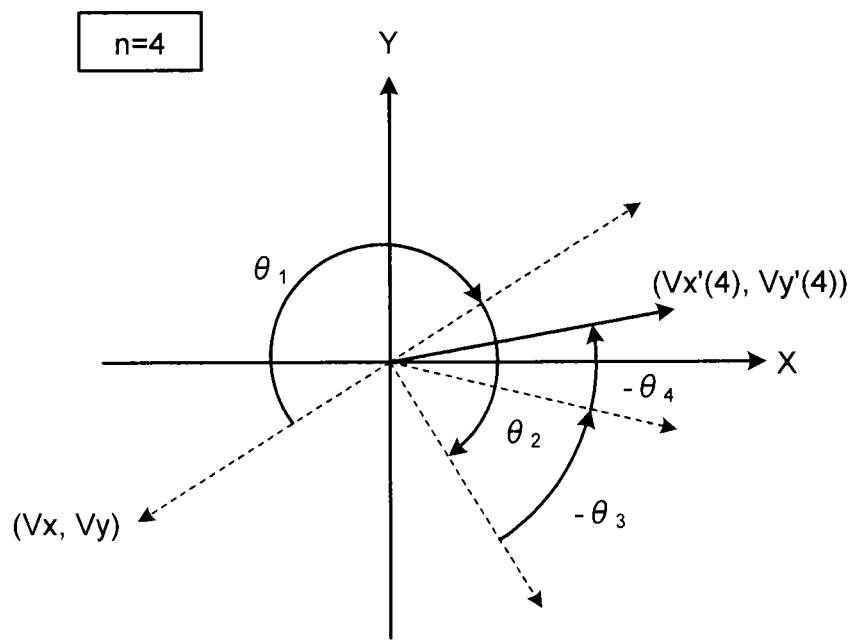
FIG. 18 is a diagram illustrating the angle search sequence at a step where count n=4.

Upon receiving a next clock clk, the sequencer 442 increments the count n to 4 as illustrated in FIG. 14, and overwrites the value of bit2, the fourth most significant bit, of the SAR 443, with 1 as illustrated in FIG. 18. Simultaneously, the sequencer 442 overwrites the value of bit3, which has been set at n=3, with 0, but does not overwrite the values of the other bits.

The detection angle data $θ_d$ having been changed for fourth time is fed back to the vector rotation circuit 430. The vector rotation circuit 430 rotates the vector (Vx, Vy) clockwise through an angle $θ_1+θ_2-θ_3-θ_4=(180+90-45-22.5)°$. Components obtained as a result of this rotation are denoted by Vx'(4) and Vy'(4) as in the case described above. The sequencer 442 detects the sign of Vy'(4) based on the sign determination result "sign". If the sign of Vy'(4) is positive, the sequencer 442 sets bit2 of the SAR 443 to 1.

The sequencer 442 repeats the sequence described above 6 times (steps) until the value of the count n, which is incremented from 1, reaches 6. Because this number of steps corresponds to the word length of the SAR 443, values of all the bits are set. It should be noted that when the value of bit0 of the SAR 443 is set to 0, a clearing process needs to be performed. This is because only the last step is followed by no next step.

The operation of the sequencer 442 described above can be generalized as follows. The rotation angle $\theta_n$ (n=1, 2, ..., and 6) of the vector (Vx'(n), Vy'(n)) is halved each step. As for the direction of rotation, the vector is rotated as follows: if the sign of the rotated Y-component Vy' is positive, the vector (Vx, Vy) is rotated clockwise in the next step; if the sign of the rotated Y-component Vy is negative, the vector (Vx, Vy) is rotated counterclockwise in the next step.

The vector (Vx'(n), Vy'(n)) is ultimately rotated to be closest to the X-axis. Accordingly, the angle between the X-axis and the vector (Vx, Vy) can be detected as the total rotation angle of the angle search sequence. This is an approximate search algorithm based on what is referred to as the bisection method.

The detection angle data $\theta_d$ indicating an angle between the output shaft of the motor 210 of the X-axis, which serves as the phase reference, can be detected as described above. Alternatively, the detection angle data $\theta_d$ may be detected as an angle between the output shaft of the motor 210 and a predetermined reference phase other than the X-axis by calculating a rotor angle as a sum of a predetermined offset value and the detection angle data $\theta_d$.

The detection angle data $\theta_d$ determined in this manner is fed to the two-phase-pulse generating circuit 450.

Each time receiving the trigger fs, the two-phase-pulse generating circuit 450 outputs the two-channel encoder-equivalent signal ENC1, ENC2 according to the generation logic illustrated in FIG. 19 using least significant two bits of the detection angle data $\theta_d$.

As described above, the rotational-position detecting circuit 222 which adopts the vector method includes the rotational-position detecting circuit 222 in the driver circuit 220. Accordingly, the rotational-position detecting circuit 222 can obtain the two-channel encoder-equivalent signal even if a rotary encoder is not provided on the output shaft of the motor 210.

The vector-method-based rotational-position detecting circuit 222 described above is an example of a rotational-position detecting circuit which adopts the vector method. The configuration of the rotational-position detecting circuit 222 is not limited to that described above. The rotational-position detecting circuit 222 may have any appropriate configuration so long as including: the vector generating circuit 420 which generates the vector (Vx, Vy) components of which are trigonometric functions of a rotation angle of the output shaft of the motor 210 based on the differential signals U+, U−, V+, and V− of the magnetic-pole-phase signals of at least two magnetic-pole phases; the vector rotation circuit 430 which rotates the vector (Vx, Vy) by performing calculation using the vector (Vx, Vy), the analog sine value A sin, and the analog cosine value A cos; the angle-search control circuit 440 which causes the vector rotation circuit 430 to rotate the vector (Vx, Vy) step by step to obtain the rotated vector (Vx'(n), Vy'(n)), and detects the angle, through which the vector has been rotated, as the detection angle data $\theta_d$; and the two-phase-pulse generating circuit 450 which obtains the two-channel encoder-equivalent signal ENC1, ENC2 based on the detection angle data $\theta_d$.

According to the embodiments, a driving device is capable of position/hold control even if a detecting device is not provided on an output shaft of a brushless DC motor or an object to be driven by the brushless DC motor.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device, comprising:
   a motor driving unit that supplies electric power to a motor according to a magnetic-pole-phase signal output from the motor; and
   a rotational-position detecting unit that converts the magnetic-pole-phase signal into a rotational-position detection signal and outputs the rotational-position detection signal, the rotational-position detection signal indicating a rotation amount and a rotation direction of an output shaft of the motor and having a higher resolution than the magnetic-pole-phase signal, wherein the rotational-position detection signal is a two-channel signal, with a fixed phase difference, an output of which varies depending on a rotation angle of the output shaft of the motor.

2. The control device according to claim 1, further comprising a control unit that transmits a control signal to the motor driving unit based on the rotational-position detection signal output from the rotational-position detecting unit and a target driving signal received from a upper-level device.

3. The control device according to claim 2, wherein the motor driving unit and the rotational-position detecting unit are on a same circuit board.

4. The control device according to claim 2, wherein the rotational-position detecting unit and a unit that generates the magnetic-pole-phase signal are on a same circuit board.

5. The control device according to claim 2, wherein the motor driving unit and the control unit are on a same circuit board.

6. The control device according to claim 2, wherein the motor driving unit and the control unit are on a same chip.

7. The control device according to claim 2, wherein
   the rotational-position detecting unit includes
      a signal selector unit that outputs a selection signal so that highly-linear phase sections selected from the magnetic-pole-phase signal are connected,
      a phase detector unit that detects phase information of the magnetic-pole-phase signal by comparing the selection signal with a predetermined threshold value, and
      a synthesizer unit that synthesizes the rotational-position detection signal based on the phase information.

8. The control device according to claim 2, wherein
   the rotational-position detecting unit includes
      a vector generating unit that generates a vector whose components are trigonometric functions of a rotation angle of the output shaft, by calculating differential signals of the magnetic-pole-phase signals of at least two magnetic-pole phases,
      a vector rotation unit that rotates the vector by performing calculation using the vector and reference sine waves,
      an angle-search control unit that detects a rotation angle through which the vector is rotated up to a predetermined phase by the vector rotation unit, and
      a two-phase-pulse generating unit that generates the rotational-position detection signal based on the rotation angle.

9. A driving device comprising:
the control device according to claim 2; and
the motor.

10. An image forming apparatus comprising the driving device according to claim 9.

* * * * *